US005978602A

United States Patent [19]

Toyofuku et al.

[11] Patent Number: 5,978,602

[45] Date of Patent: Nov. 2, 1999

[54] PHOTOGRAPHIC LENS UNIT AND PHOTOGRAPHING METHOD

[75] Inventors: Toshiyuki Toyofuku, Hachioji; Yasuo Isashi, Sagamihara; Fuminori Ueno, Hachioji; Shigeo Hayashi, Okaya, all of Japan

[73] Assignee: Olympus Optical Co., Inc., Tokyo, Japan

[21] Appl. No.: 08/910,985

[22] Filed: Aug. 7, 1997

[30] Foreign Application Priority Data

Aug. 12, 1996 [JP] Japan .................................... 8-212732

[51] Int. Cl.[6] ............................ G03B 13/34; G03B 15/03

[52] U.S. Cl. .............................................. 396/62; 396/132

[58] Field of Search ................................ 396/132, 61, 90, 396/62

[56] References Cited

U.S. PATENT DOCUMENTS 5,311,239 5/1994 SanGregory et al. .................. 396/132

5,710,949 1/1998 Akimoto et al. ........................ 396/132

*Primary Examiner*—W. B. Perkey

*Attorney, Agent, or Firm*—Louis Weinstein

[57] ABSTRACT

A photographic lens unit having a stepping motor to drive a cam ring that has a cam portion for driving a counter-cam portion of a lens frame for automatic focus of photographic lenses, and projections for driving a diaphragm. The cam ring is rotated for moving the counter-cam portion in an optical-axis direction with the counter-cam portion in contact with the cam portion. Automatic focus of the photographic lenses and photometry are carried out. Thereafter, the cam ring is further rotated so that the projection can bring the diaphragm to an aperture-narrowing state. The cam ring is then rotated reversely for moving the photographic lenses to an automatic focus position. Photographic operations are then carried out. After photography is completed, the diaphragm is reset by moving the counter-cam portion. The photographic lens unit is thus brought to a ready state for subsequent photography. According to this photographic lens unit, since the driven part enabling automatic focus and the diaphragm can be driven by a simple driving mechanism, the structure of the photographic lens unit can be simplified and a space occupied by the photographic lens unit can be limited.

5 Claims, 20 Drawing Sheets

PHOTOGRAPHIC LENS UNIT AND PHOTOGRAPHING METHOD

BACKGROUND OF THE INVENTION

1. Field of the Invention

The present invention relates to a photographic lens unit having a driving mechanism for advancing or withdrawing photographic lenses and driving a diaphragm therein, and to a photographing method of carrying out photography using the photographic lens unit.

2. Description of the Related Art

Almost none of conventional photographic lens units for cameras are designed to drive photographic lenses and a diaphragm using a single driving source. Normally, many leaf shutter type cameras have a structure where the same driving source is used to drive a diaphragm and shutter. It is quite rare that both a driven part enabling automatic focus and the diaphragm are driven by a single driving source.

In the conventional photographic lens units, two independent driving sources are often used to drive a driven part enabling automatic focus and operation of a diaphragm. The necessity of the two driving sources and respective drive gearing mechanisms poses a cost-related problem and problems that the structure of a photographic lens unit becomes complex and that the space occupied by the photographic lens unit gets larger.

OBJECT AND SUMMARY OF THE INVENTION

The present invention attempts to resolve the above drawback. An object of the present invention is to provide a photographic lens unit using a simple driving mechanism to drive both a driven part enabling automatic focus and a diaphragm, which is low, has a simple structure, and occupies only a limited space, and a photographing method.

In a photographic lens unit of the present invention in which an automatic focus driving mechanism for driving a driven part enabling automatic focus which is needed to automatically focus photographic lenses and a diaphragm driving mechanism for driving a diaphragm share the same driving element, the driving element is a cam mechanism including a cam portion used for automatic focus.

In the foregoing photographic lens unit, the cam mechanism is responsible for automatic focus and diaphragm drive. A single driving source is used to provide drive to both the focus and diaphragm mechanisms. The structure of the photographic lens unit can be simplified, and a space occupied by the photographic lens unit can be limited. Thus, a cost-efficient photographic lens unit can be provided.

A photographing method of the present invention is a photographing method to be implemented in a photographic lens unit in which an automatic focus driving mechanism for driving a driven part enabling automatic focus which is needed for automatically focusing photographic lenses, and a diaphragm driving mechanism for driving a diaphragm share the same driving element. The driven part enabling automatic focus is brought into contact with the automatic focus driving mechanism and moved in an optical-axis direction. After the photographic lenses are automatically focused, the diaphragm driving mechanism is brought into contact with the diaphragm. After aperture narrowing is performed by the diaphragm, photographic operations are carried out. Thereafter, the diaphragm is freed.

The above as well as other features and advantages of the present invention will be apparent from the detailed description set forth below.

DESCRIPTION OF THE PREFERRED EMBODIMENT

An embodiment of the present invention will be described in conjunction with the drawings.

Figure 1:
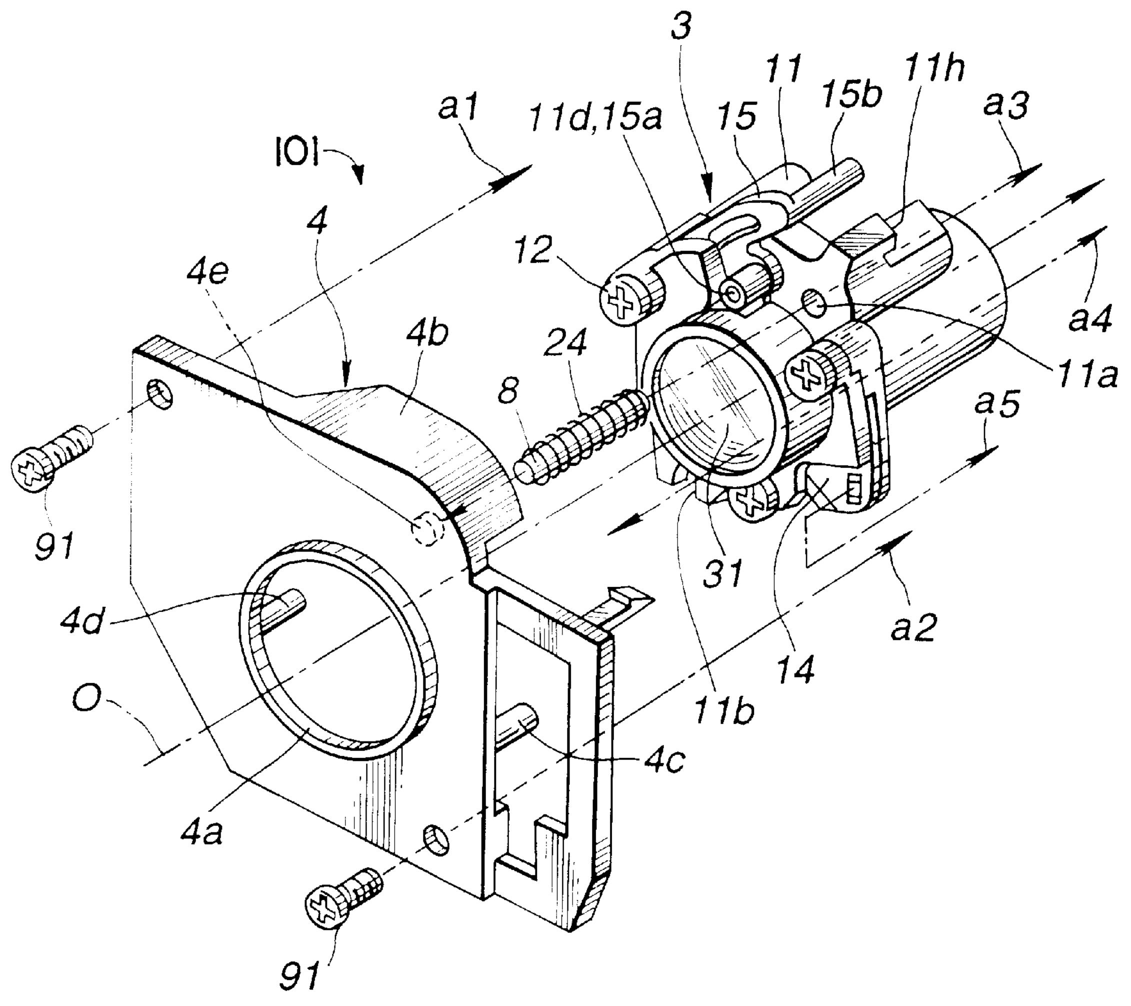
FIG. 1 is part of an exploded oblique view of a photographic lens unit of an embodiment of the present invention.
Figure 2:
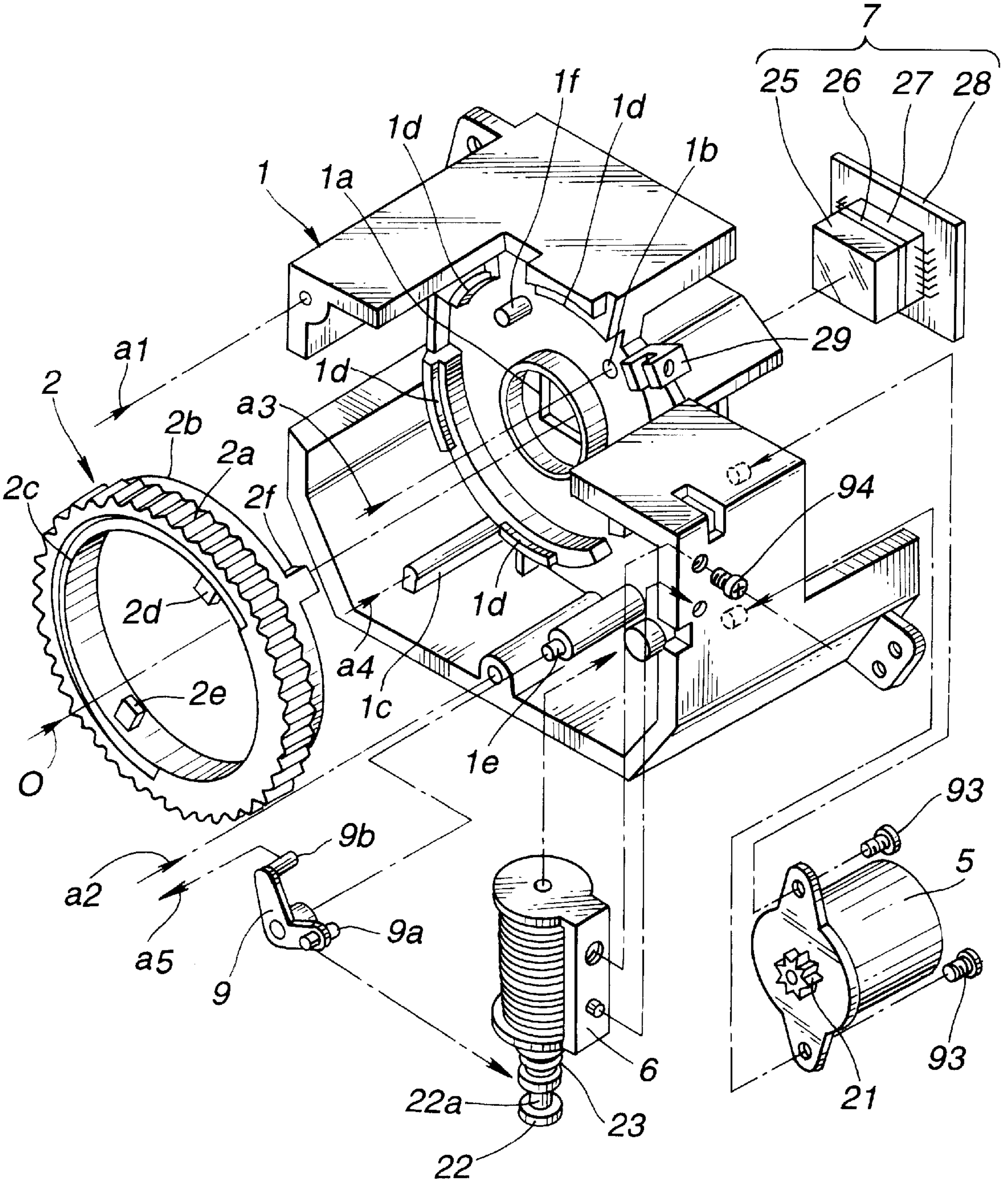
FIG. 2 is part of the exploded oblique view of the photographic lens unit of the embodiment of the present invention.
Figure 3:
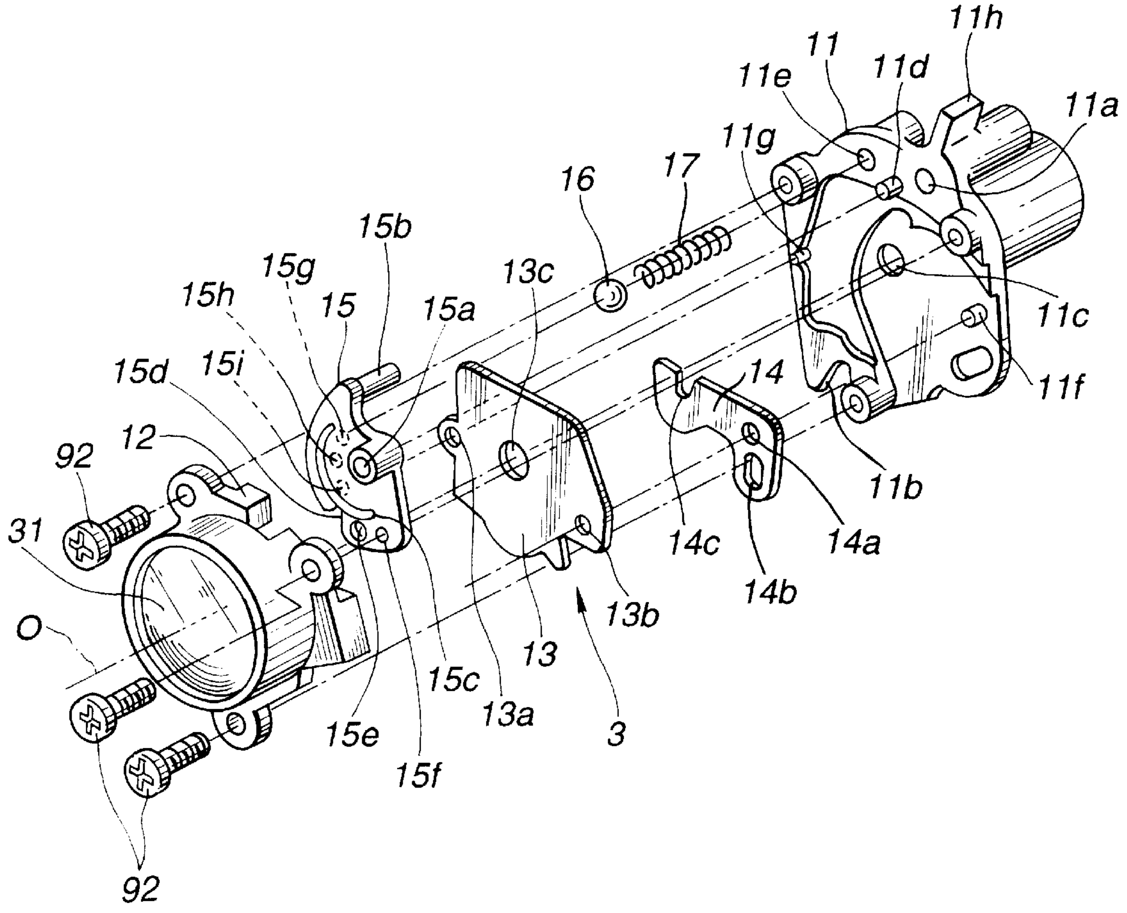
FIG. 3 is an exploded oblique view of a lens frame incorporated in the photographic lens unit shown in FIGS. 1 and 2.

FIGS. 1 and 2 are exploded oblique views showing a photographic lens unit in accordance with an embodiment of the present invention. In the drawings, a1 to a5 indicate junctions between FIGS. 1 and 2. FIG. 3 is an exploded oblique view of a lens frame incorporated in the photographic lens unit.

The photographic lens unit 101 is a photographic lens unit capable of being incorporated in an electronic still camera or the like and of enabling an automatic focus control unit in the camera to carry out automatic focus (AF) drive for photographic lenses.

The photographic lens unit 101 consists mainly of: a main unit 1; a cam ring 2, attached freely rotatably to the main unit 1, serving as a cam mechanism that is a common driving mechanism having the capabilities of a diaphragm driving mechanism and automatic focus driving mechanism; a lens frame 3, supported by the main unit 1 so that the lens frame 3 can advance or withdraw freely along an optical axis 0 of photographic lenses, for holding the photographic lenses 31 and 32 (See FIG. 6); a suspension shaft 8, sheathed with a lens frame constraining spring 24 and locked in a support hole 1*b* of the main unit 1 and a support hole 4*e* of a cover 4, for guiding the lens frame 3 in the optical-axis direction; and a shutter driving lever 9, supported by a support pin 1*e* of the main unit 1 so that the shutter driving lever 9 can pivot freely, and used to drive a shutter blade 14.

In addition, the photographic lens unit 101 comprises a CCD unit 7 fixed behind a photographic aperture la of the main unit 1; a photointerrupter 29 for detecting a rotational position on the cam ring 2 or a position on the cam ring 2 which has been changed in angle with the rotation of the cam ring 2 in cooperation with a shield plate 2*f;* the cover 4 fixed to the main unit 1 using attachment screws 91; a stepping motor 5, fixed to the main unit 1 with attachment screws 93, having a pinion 21 fixed to an output axis thereof and serving as a driving source for diaphragm/automatic focus drive; and an electromagnet 6 fixed to the main unit 1 with an attachment screw 94 and used for driving a shutter.

The cam ring 2 has a gear portion 2*a* capable of meshing with the pinion 21 on the outer circumference thereof, a cylindrical end 2*b* for supporting rotation, the shield plate 2*f* for detecting a rotational position, a cam portion 2*c* that is a cam formed on a cylindrical end surface and serves as an automatic focus driving mechanism used to automatically focus the lens frame 3, and a diaphragm resetting projection 2*d* and diaphragm setting projection 2*e* constituting a diaphragm driving mechanism capable of driving the diaphragm plate 15 by abutting on it.

Figure 4:
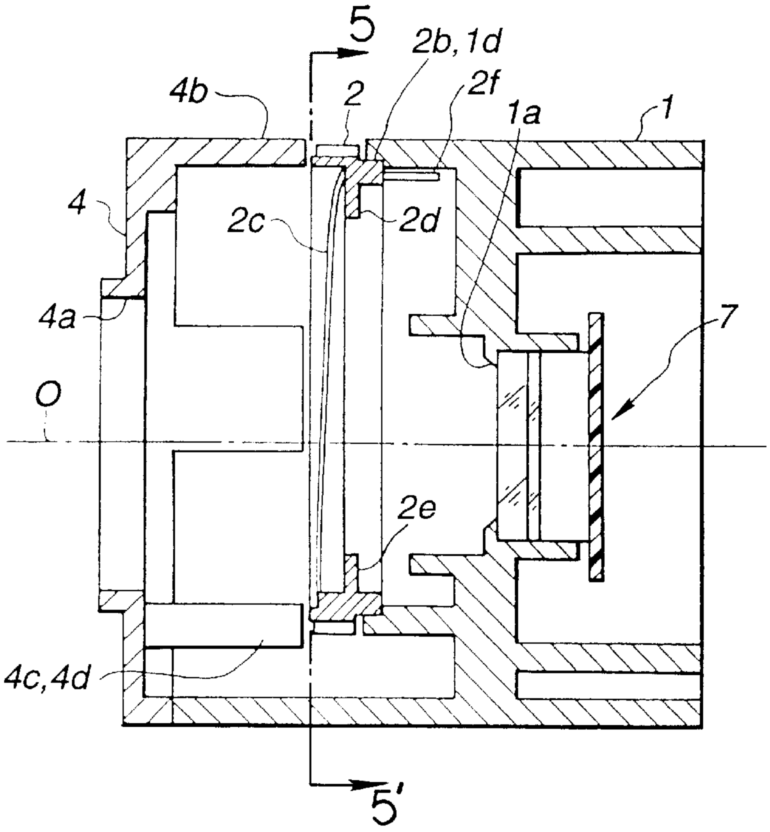
FIG. 4 is a longitudinal sectional view of a cam ring-mounted state of the photographic lens unit shown in FIGS. 1 and 2.
Figure 5:
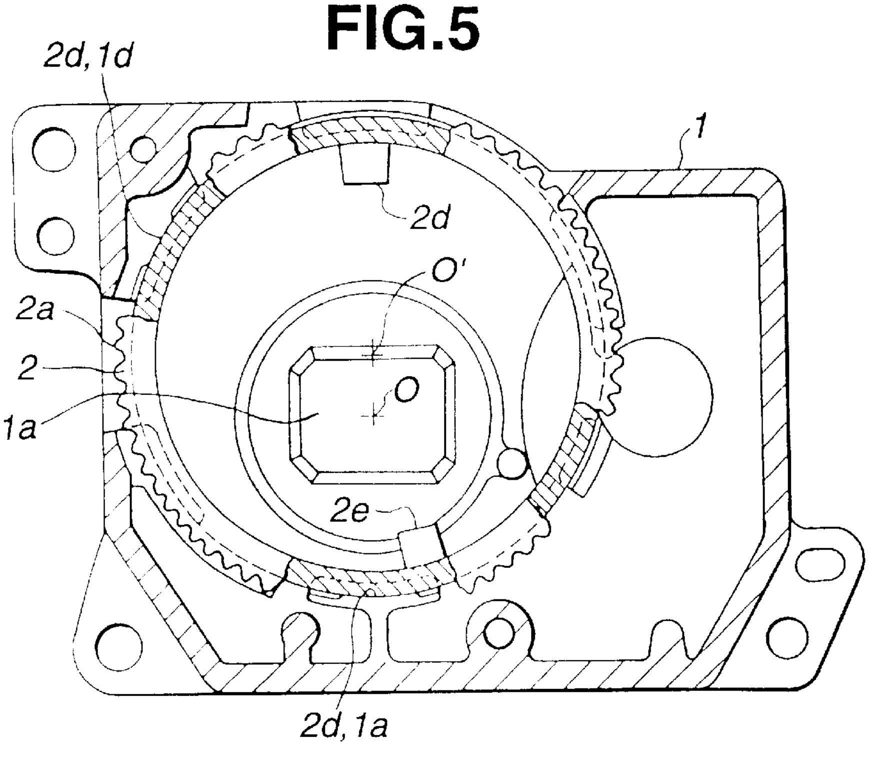
FIG. 5 is a 5—5' sectional view relevant to FIG. 4.

For mounting the cam ring 2 in the main unit 1, as shown in FIG. 4 that is the longitudinal sectional view showing a state in which the cam ring is mounted and FIG. 5 that is the 5—5' sectional view relevant to FIG. 4, the cover 4 is fixed to the main unit with the cylindrical end 2*b* inserted into circular guide ditches 1*d* in the main unit 1. This causes the cam ring 2 to be freely rotatably held with the movement of the end of the cam ring 2 in the axial direction restricted by juts 4*b,* 4*c,* and 4*d* of the cover 4. In this state, the pinion 21 of the stepping motor 5 meshes with the gear 2*a.* The cam ring 2 is driven to rotate with the rotation of the motor 5.

Figure 12:
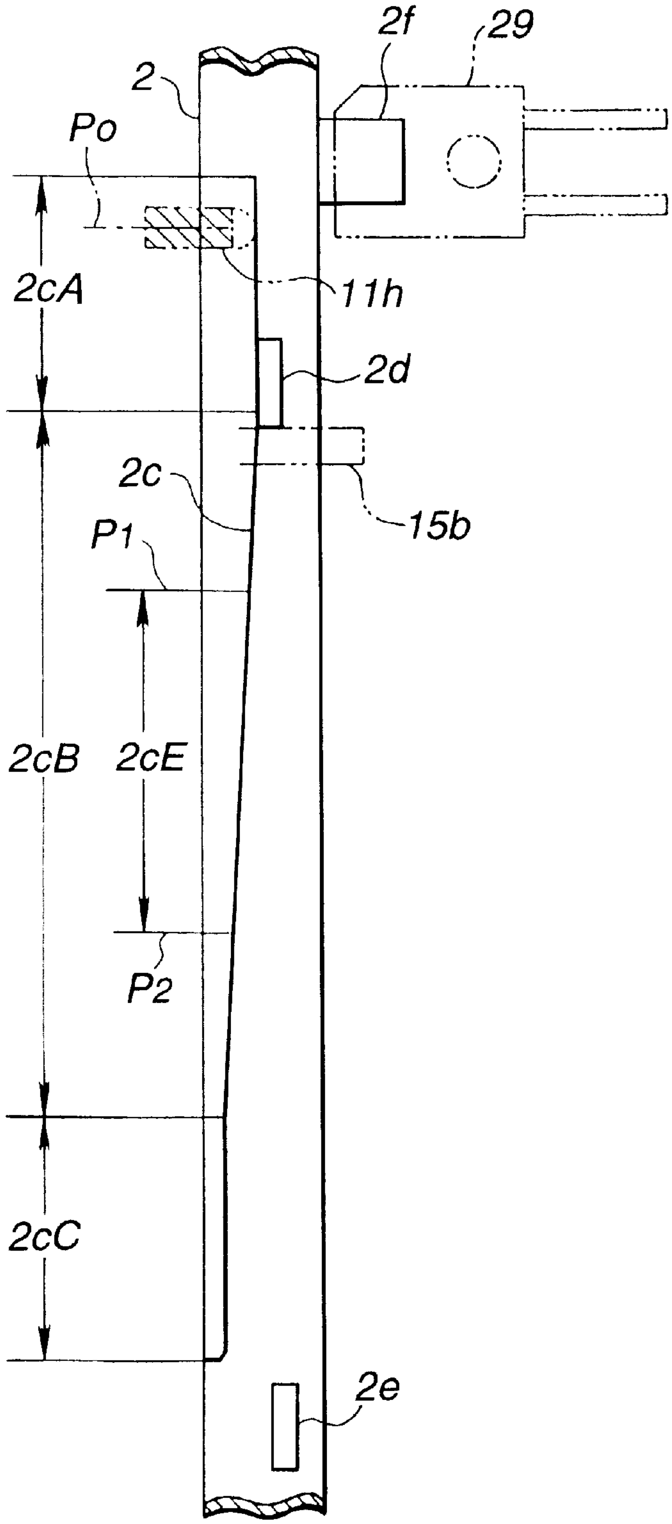
FIG. 12 shows the development of the cam ring of the photographic lens unit shown in FIGS. 1 and 2.

The cam portion 2*c* has, as seen from the development in FIG. 12 that will be referenced later, a lens frame advancement/withdrawal area 2*c*B in the center thereof, and a diaphragm resetting area 2*c*A and diaphragm setting area 2*c*C that are flat at both ends thereof. With a rotation of the cam ring 2, a counter-cam portion 11*h* of the lens frame 3 which will be described later abuts on and moves over the areas. When the counter-cam portion 11*h* is located in the diaphragm resetting area 2*c*A or diaphragm setting area 2*c*C, the resetting projection 2*d* or setting projection 2*e* presses the diaphragm plate 15. Thus, diaphragm resetting or setting is carried out.

The lens frame 3 includes, as shown in the exploded oblique view of FIG. 3, a back frame 11 located near an imaging device; a front frame 12 located on an object side, the diaphragm plate 15 that is an element of a diaphragm mechanism interposed between the front frame 12 and back frame 11; the shutter blade 14 for opening or closing the photographic aperture 11*c;* a partition member 13 placed as a partition between the shutter blade 14 and diaphragm plate 15, having an opening 13*c* for defining the diameter of an open aperture, and positioned by a pin 11*g* and a support pin 11*f;* and a ball constraining spring 17 and diaphragm plate positioning ball 16 which are inserted into a ball guide hole 11*e* of the back frame 11.

Figure 6:
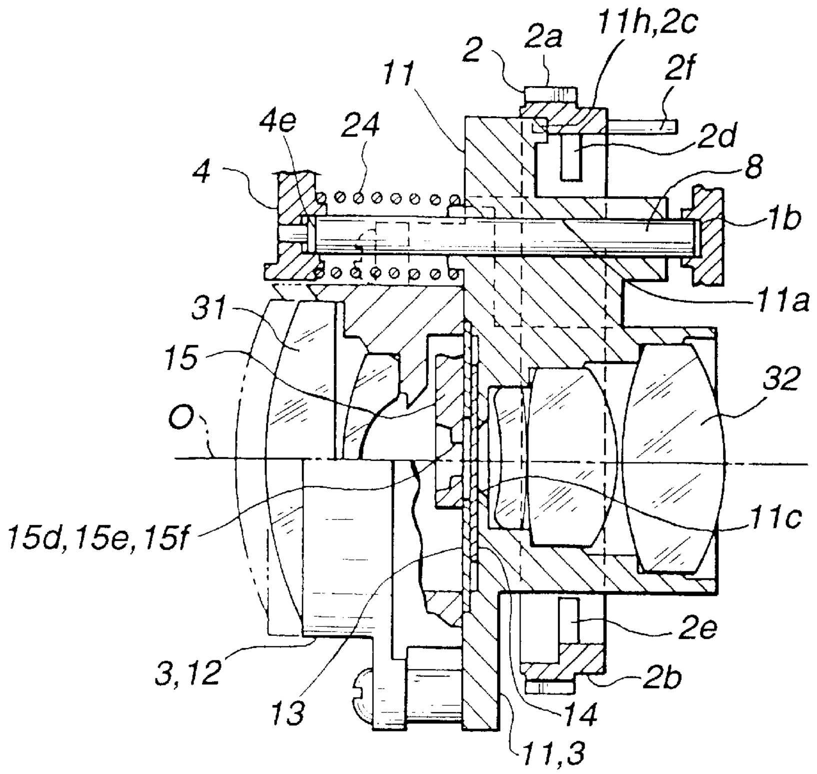
FIG. 6 is a longitudinal sectional view of a lens frame of the photographic lens unit shown in FIGS. 1 and 2.

The back frame 11 holds the photographic lens 32, and has a shaft hole 11*a* into which the suspension shaft 8 is fitted so that the suspension shaft can slide freely, and a notch 11*b* to be engaged with a guide 1*c* of the main unit 1. The back frame 11 further includes the counter-cam portion 11*h* (See the longitudinal sectional view of FIG. 6 showing the lens frame) located outside the shaft hole 11*a,* capable of abutting on the cam portion 2*c* of the cam ring 2, and serving as a driven part enabling automatic focus; the support pin 11*d* for supporting the diaphragm plate 15 so that the diaphragm plate can pivot freely, the support pin 11*f* for supporting the shutter blade 14 so is that the shutter blade can pivot freely, a photographic aperture 11*c,* and the ball guide hole 11*e.*

The front frame 12 holds the photographic lens 31 and is fixed to the back frame with attachment screws 92 and thus united with the back frame 11 to constitute the lens frame 3.

The diaphragm plate 15 is attached by matching an axis hole 15*a* with the support pin 11*d* of the back frame 11 so that the diaphragm plate 15 can pivot freely. The diaphragm plate 15 has a three-step turret structure where an open aperture portion 15*d*, a medium stop 15*e*, and a little stop 15*f*, which become coincident with the photographic aperture 11*c* of the back frame 11 located in the center of the optical axis O, are arranged on an arc equidistantly from the axis hole 15*a*. Moreover, an arched jut 15*c* is formed on a surface coming into contact with the front frame 12 for the purpose of reducing resistance stemming from sliding.

The diaphragm plate 15 has counter-ball holes 15*g*, 15*h*, and 15*i* at positions at which the positioning ball 16 of the back frame 11 comes when the open aperture portion 15*d*, medium stop 15*e*, and little stop 15*f* are opposed to the photographic aperture 11*c*. The engagement of the positioning ball with each hole gives clicking force at each position. An abutment pin 15*b* that is an abutment member on which the projections 2*d* and 2*e* of the cam ring 2 can abut is formed to extend outward beyond the back frame. The abutment pin 15*b* has a given length permitting the projections 2*d* and 2*e* to abut on the abutment pin even when the lens frame 3 advances or withdraws as shown in the longitudinal sectional view of FIG. 7 showing the diaphragm plate and its surroundings in the lens frame 3.

When a zoom lens or the like is employed, a magnitude of advancement or withdrawal of the lens frame is large. In this case, a cam ring 2' moves farther backward as shown in FIG. 7. An abutment pin 15*b*' of the diaphragm plate 15 is therefore made longer, whereby the mechanisms of the present invention can apply.

The shutter blade 14 has a V-shaped notched part 14*c* at a position opposed to the photographic aperture 11*c* and an elongated hole 14*b* into which a driving pin 9*b* of the shutter driving lever 9 can be fitted, and is attached to the back frame 11 so that the shutter blade can pivot freely over the photographic aperture 11*c* with respect to the support pin 11*f* of the back frame 11.

Figure 7:
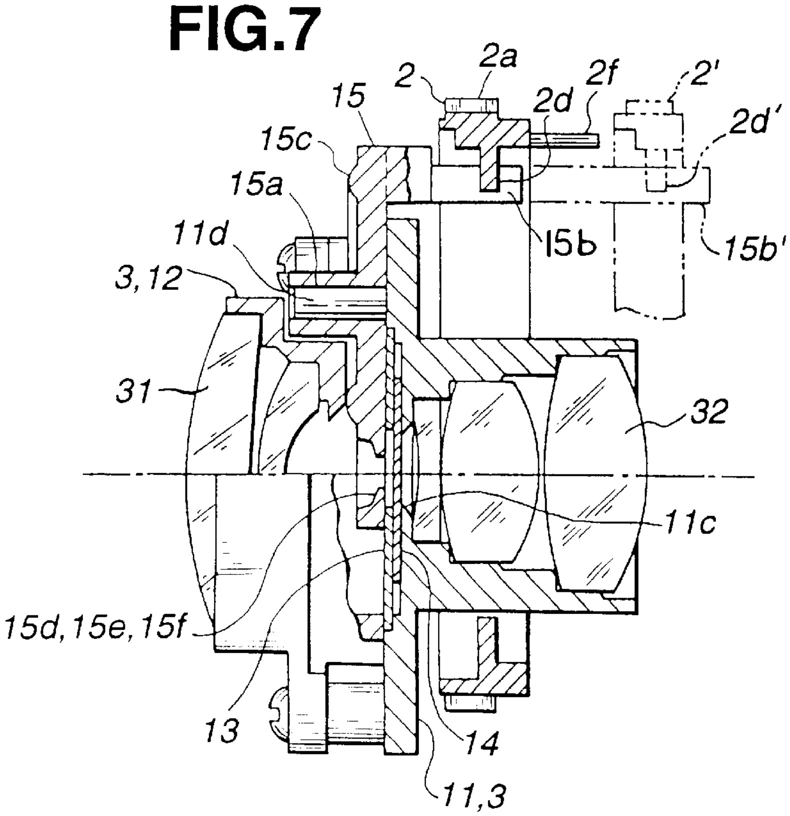
FIG. 7 is a longitudinal sectional view of a diaphragm plate and its surroundings in the lens frame of the photographic lens unit shown in FIGS. 1 and 2.

The order of the diaphragm plate 15, partition member 13, and shutter blade 14 arranged in the optical-axis direction is, as shown in the longitudinal sectional view of FIG. 6 showing the lens frame or the longitudinal sectional view of FIG. 7 showing the diaphragm plate and its surroundings, such that the diaphragm plate 15, partition member 13, and shutter blade 14 are arranged in that order from the front frame 12 between the front frame 12 and back frame 11.

Figure 11:
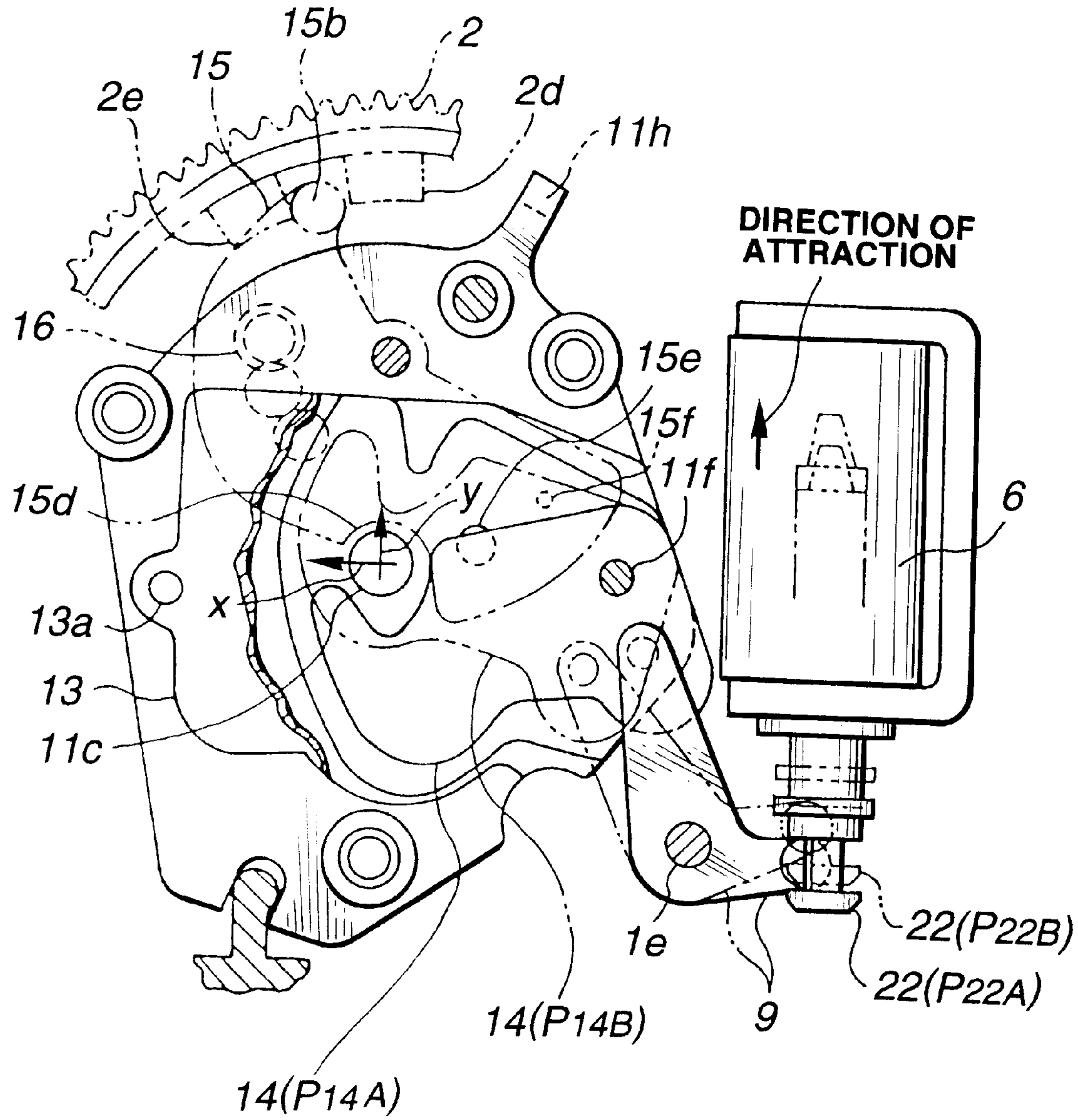
FIG. 11 is a sectional view showing a moved state of a shutter blade with the lens frame of the photographic lens unit shown in FIGS. 1 and 2 seen from the object side.

The electromagnet 6 has a return spring 23 attached thereto, includes a plunger 22 that is a movable iron core capable of being thrust or attracted. The plunger 22 has a groove 22*a* into which a driving pin 9*a* of the shutter driving lever 9 is fitted. As shown in FIG. 11, when the electromagnet 6 is turned off, the plunger 22 is located at a thrust position P22A or a position to which the plunger is thrust. When the electromagnet 6 is turned on, the plunger 22 is located at an attracted position P22B or a position to which the plunger is attracted.

The CCD unit 7 is composed of an optical filter 25, a spacer 26, and a CCD 27 that is an imaging device, and united with the a printed-circuit board 28.

Figure 8:
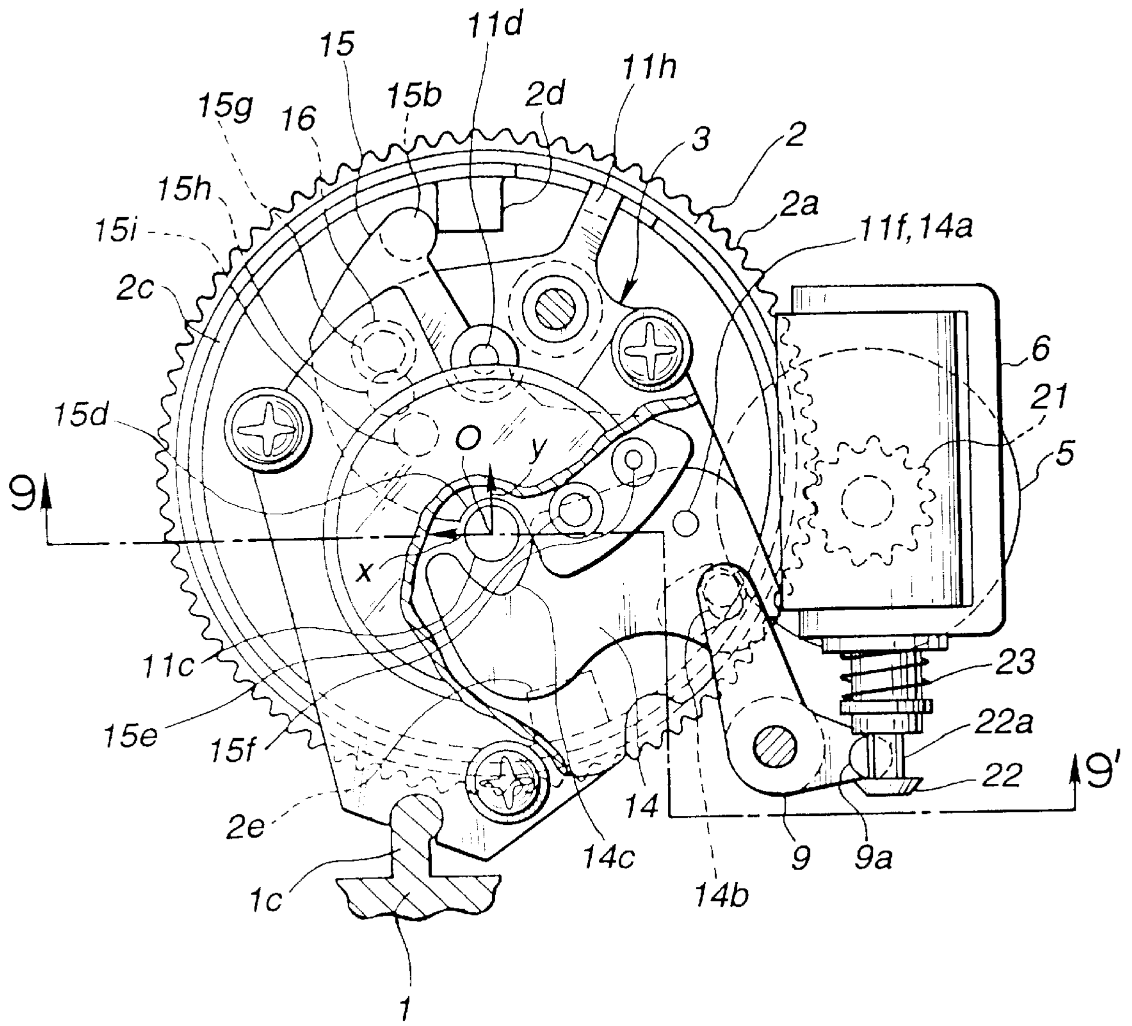
FIG. 8 is a sectional view showing the arrangement of members of an optical system including the diaphragm plate and a driving source including an electromagnet and motor in the photographic lens unit shown in FIGS. 1 an 2 with the members and driving source seen from an object side.
Figure 9:
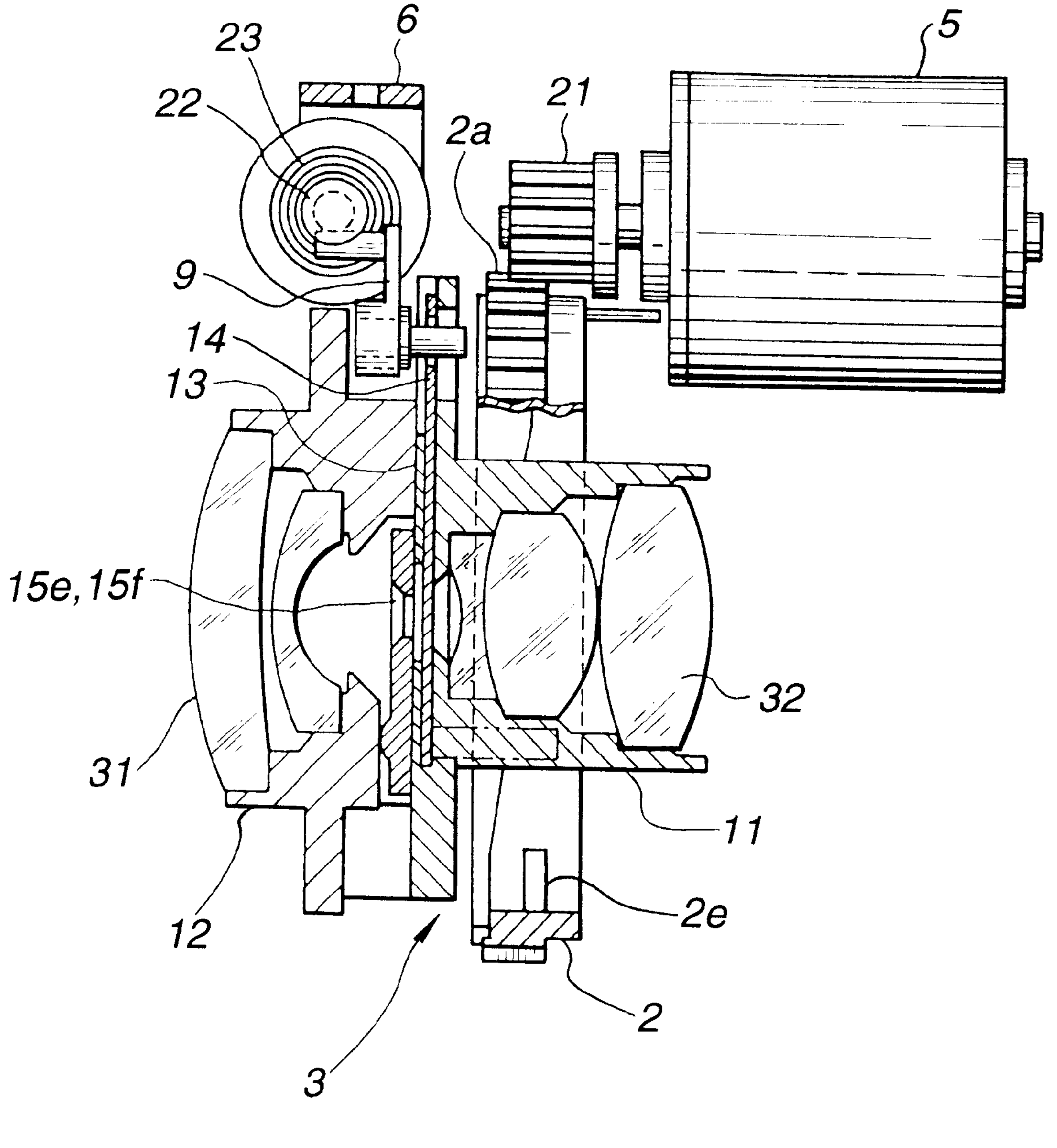
FIG. 9 is a 9—9' sectional view relevant to FIG. 8.

Next, the arrangement of members of the optical system including the diaphragm plate and driving members including the electromagnet will be described in conjunction with FIGS. 8 and 9. FIGS. 8 and 9 are diagrams showing a state in which the diaphragm plate, shutter blade, electromagnet, and stepping motor are arranged. FIG. 8 is a sectional view showing these components with the components seen from an object side along the optical axis, and FIG. 9 is a 9—9' sectional view relevant to FIG. 8.

As shown in FIG. 8, the position of the optical axis O in the lens frame 3 is eccentric to the center of rotation, O', of the cam ring 2. Owing to the eccentricity, the diaphragm plate 15 can be placed near the center of the cam ring 2. Besides, a structure where the abutment pin 15*b* used for pivoting drive is confined to the inside of the inner circumference of the cam ring 2 can be adopted, whereby the cam ring 2 can be designed compactly.

The centers of rotation of the diaphragm plate 15 and shutter blade 14 (support pins 11*d* and 11*f*) are located at an upper position and right-hand position in directions (y-axis direction) (x-axis direction) in FIG. 8 which are crossing at the photographic aperture 11*c* on the optical axis O. By thus setting the centers of rotation, a direction in which the open aperture portion 15*b* and the stops 15*e* and 15*f* are moved to be switched, and a direction in which the the notched part 14*c* for closing the aperture is moved are crossing at the optical axis O. An effect exerted by this setting will be described later.

The electromagnet 6 for driving the shutter blade and the stepping motor 5 for driving the cam ring are, as shown in FIG. 8, located on the right-hand side of the lens frame 3 with the electromagnet and stepping motor seen from an object side. As for the arrangement of the components along the optical axis O, as shown in FIG. 9, the electromagnet 6 is located on the flank of the front frame 12 of the lens frame 3, and the stepping motor 5 is located laterally to the back frame 11 and extends backward in an image formation space. This arrangement is advantageous because the shutter blade 14 that is a load to be driven by the electromagnet 6 is located substantially in the center of the lens frame. Moreover, since the cam ring 2 that is a load to be driven by the stepping motor is located laterally to the back frame 11, the arrangement is advantageous. Furthermore, the arrangement is preferable because of the the size of the motor.

Figure 10:
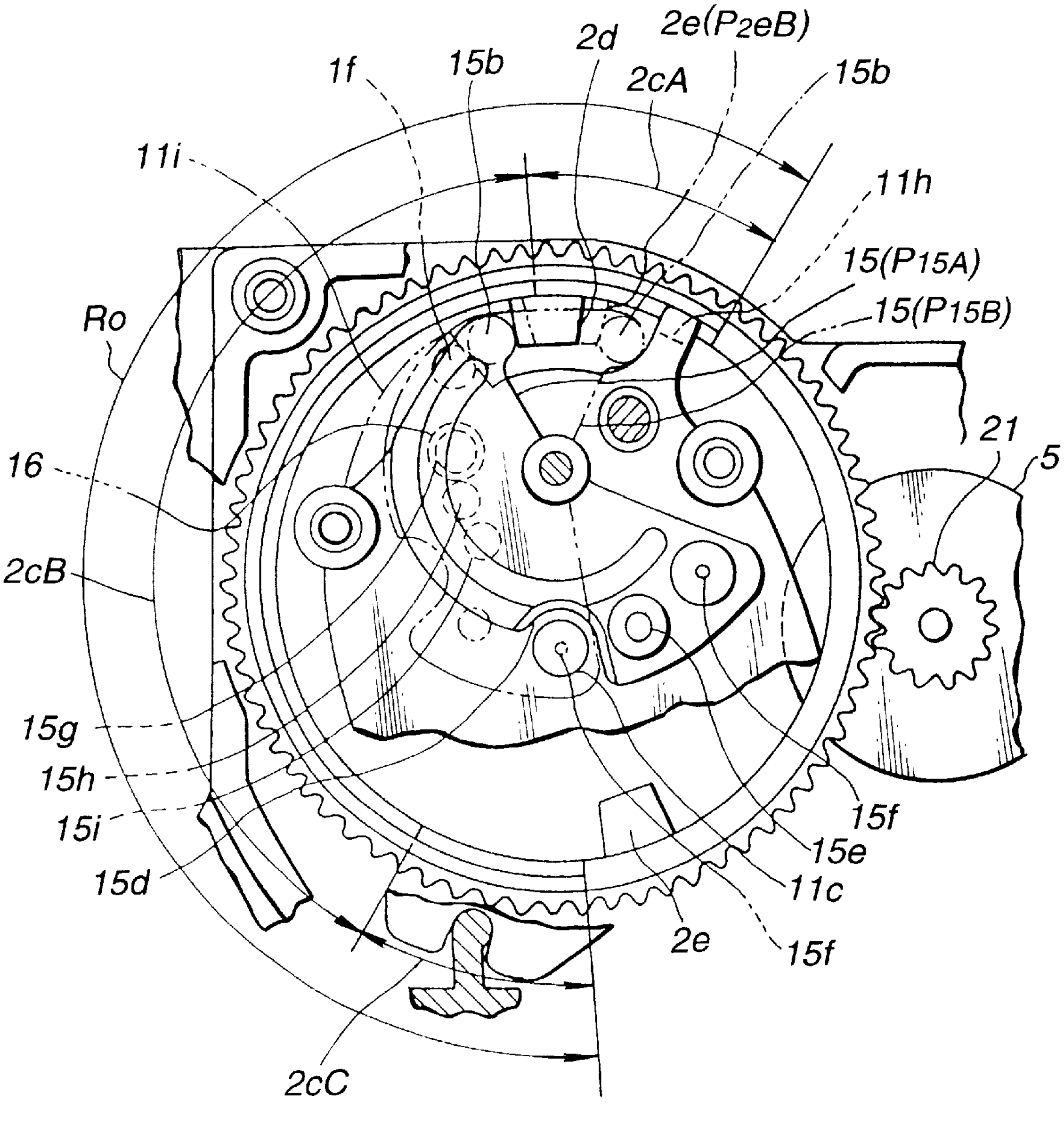
FIG. 10 is a sectional view showing moved states of the diaphragm plate and cam ring with the lens frame of the photographic lens unit shown in FIGS. 1 and 2 seen from the object side.
Figure 13:
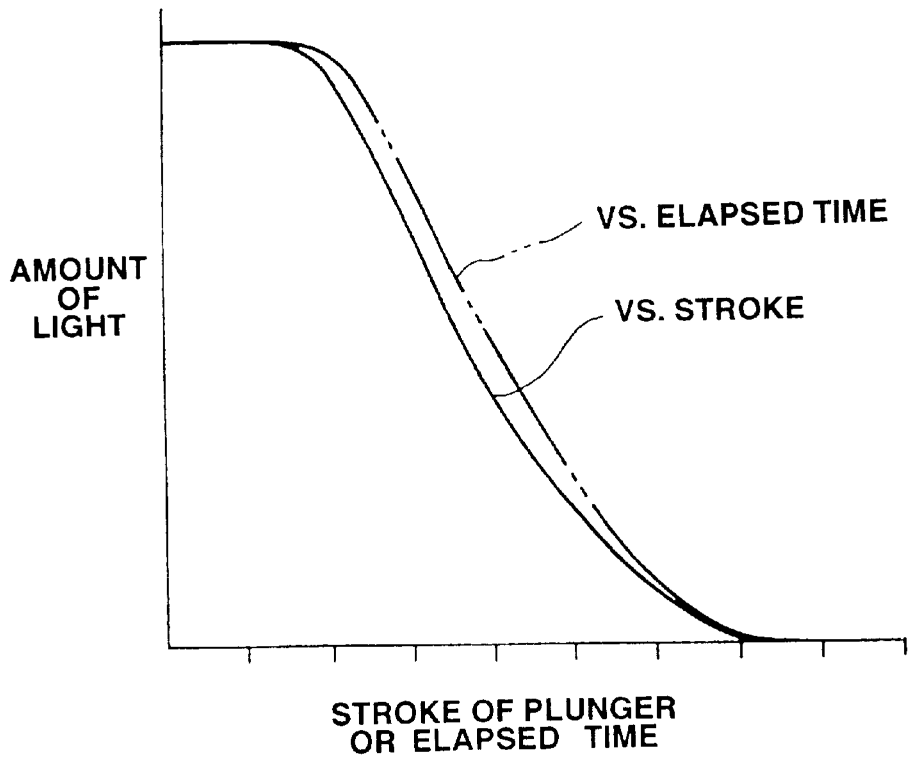
FIG. 13 is a graph showing a change in amount of light passed by a shutter in relation to the strokes of a plunger for an electromagnet in the photographic lens unit shown in FIGS. 1 and 2, or elapsed times.
Figure 14:
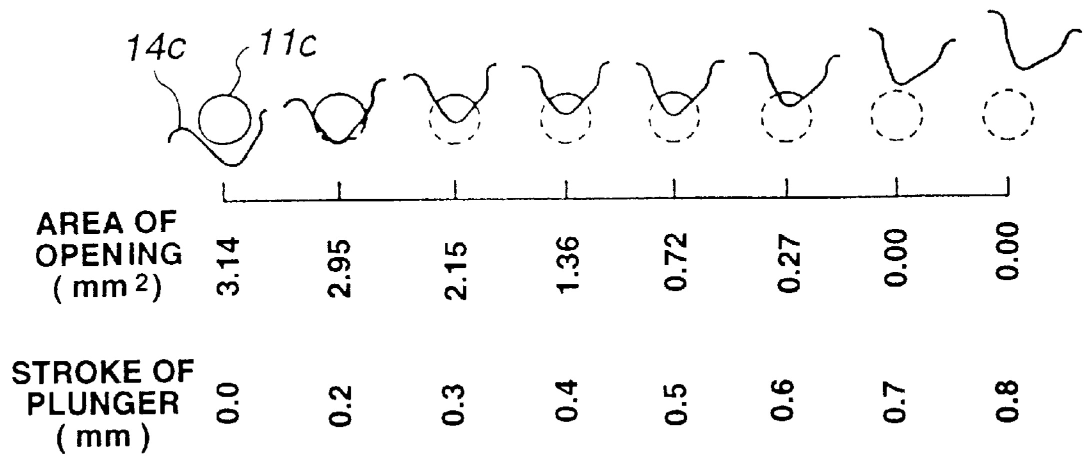
FIG. 14 is a diagram showing a change in area of an aperture hidden behind the shutter in relation to the strokes of the plunger for the electromagnet in the photographic lens unit shown in FIGS. 1 and 2.

Next, movements of opening or closing the diaphragm or shutter in the photographic lens unit 101 and a movement for automatic focus having the foregoing components will be described in conjunction with FIGS. 10 to 14. FIG. 10 is a sectional view showing the moved states of the diaphragm plate and cam ring with the lens frame seen from an object side, and FIG. 11 is a sectional view showing the moved state of the shutter blade with the lens frame seen from the object side. FIG. 12 shows the development of the cam ring. FIG. 13 is a graph showing a change in amount of light passed by the shutter in relation to the strokes of the plunger or times, and FIG. 14 is a diagram showing the values of the area of the aperture hidden behind the shutter and the shapes of the aperture in relation to the strokes of the plunger.

To begin with, movements to be made by the lens frame and the diaphragm respectively responsive to the rotation of the cam ring 2 will be described. The cam ring 2 has, as shown in FIG. 12, the cam portion 2*c* composed of the advancement/withdrawal area 2*c*B whose height varies along the optical axis O, and the diaphragm resetting area 2*c*A and diaphragm setting area 2*c*C that are flat. When the cam ring is driven to rotate by means of the stepping motor 5, as shown in FIG. 10, the counter-cam portion 11*h* of the lens frame 3 (See FIGS. 3 and 8) slides within a rotational range R0 on the cam portion 2*c*.

When the counter-cam portion 11*h* reaches the area 2*c*A within the range R0, a diaphragm resetting movement is made as described later and the diaphragm is reset when the counter-cam portion reaches a position P0. The arrival of the counter-cam portion at the position P0 is sensed by the photointerrupter 29 that detects the presence of the shielding plate 2*f* (See FIG. 12). When the counter-cam portion 11*h* moves within a given range and slides in the advancement/ withdrawal area 2*c*B, the lens frame 3 is driven to advance or withdraw along the suspension shaft 8 against the constraining spring 24. Thereby, an automatic focus movement is made, that is, automatic focus is carried out. The magnitude of a movement made in the advancement/withdrawal area 2*c*B is set to be large enough to absorb (i.e., compensate for) an error of the lens frame from another produced during manufacturing of lenses. During actual assembling and adjustment, part of the area 2*c*B, for example, an area 2*c*E (between rotational positions P1 and P2 or positions on the cam portion of which angles are changed with the rotation of the cam portion) is selected as an area used to focus the camera on positions ranging from a very near position to an infinite position. When the counter-cam portion 11*h* reaches the area 2*c*C, a diaphragm resetting movement that will be described later is made.

For making the diaphragm resetting movement, the cam ring 2 is rotated counterclockwise. When the counter-cam portion 11*h* reaches the area 2*c*A, the projection 2*d* of the cam ring 2 causes the abutment pin 15*b* of the diaphragm plate 15 to pivot counterclockwise. When the counter-cam portion 11*h* reaches the position P0, the diaphragm plate 15 has pivoted to a reset position P15A or a position at which the diaphragm is reset. The open aperture portion 15*d* coincides with the photographic aperture 11*f* of the lens frame 3. Thus, a full open state is attained.

At this time, the positioning ball 16 engages with the counter-ball hole 15*g* of the diaphragm plate 15. The diaphragm plate 15 is retained at the reset position P15A with given clicking force. Owing to the given clicking force, even if the projection 2*d* of the cam ring 2 is separated from the abutment pin 15*b* of the diaphragm plate 15 during a subsequent automatic focus movement, the diaphragm is retained in the reset state.

Furthermore, in the diaphragm reset state, the abutment pin 15*b* is sandwiched by the projection 2*d* for resetting and a projection 1*f* of the main unit 1 serving as a holding mechanism. In this state, even if the camera is unused and the power supply is turned off, the cam ring 2 is retained in position owing to a cogging torque exerted by the stepping motor 5. The diaphragm plate 15 is retained at the reset position P15A. When the camera is unused, even if vibrations or an impact works on the diaphragm plate, the diaphragm plate 15 will be retained at the reset position. Displacement can be prevented, and the restart of photography will not be hindered. Moreover, the members of the optical system can be prevented from being broken during transportation.

The projection 1*f* of the main unit 1 serving as a holding mechanism may be formed on the lens frame 3. For example, a stopper 11*i* (See FIG. 10) may be formed on the back frame 11 in order to retain the diaphragm plate 15 at the reset position.

For making a diaphragm setting movement, the cam ring 2 is temporarily rotated clockwise so that the counter-cam portion 11*h* moves from the position P0 that is the reset position to the diaphragm setting area 2*c*C. However, when photography is carried out with the diaphragm set in the full open state, the cam ring 2 need not be rotated until the counter-cam portion comes to the diaphragm setting area 2*c*C. Advancement/withdrawal drive is carried out with the counter-cam portion located in the lens frame advancement/withdrawal area 2*c*B.

When diaphragm setting is setting the diaphragm to a medium open state, after the counter-cam portion 11*h* moves to the area 2*c*C and the setting projection 2*e* abuts on the abutment pin 15*b* of the diaphragm plate 15, the cam ring is further rotated clockwise. When the medium stop 15*e* coincides with the photographic aperture 11*c,* the rotation of the cam ring 2 is stopped. In this state, since the positioning ball 16 engages with the counter-ball hole 15*h,* the diaphragm plate 15 is retained with given clicking force. The diaphragm is thus set to a medium open state.

When diaphragm setting is setting the diaphragm to a little open state, the cam ring is rotated until the counter-cam portion 11*h* reaches the area 2*c*C. After the setting projection 2*e* abuts on the abutment pin 15*b* of the diaphragm plate 15, the cam ring is further rotated clockwise. When the little stop 15*f* coincides with the photographic aperture 11*c* of the lens frame 3, the rotation of the cam ring 2 is stopped. In this state, the diaphragm plate 15 is located at a rotational position P15B in FIG. 10 or a position to which the diaphragm plate is rotated. The positioning ball 16 engages with the counter-ball hole 15*i.* The diaphragm plate is retained with given clicking force. Thus, the diaphragm is set to a little open state.

After diaphragm setting is carried out as mentioned above, the cam ring 2 is rotated counterclockwise. When the counter-cam portion 11*h* lies in the area 2*c*E (between the rotational positions P2 and P1) within an automatic focus movement range of the cam ring 2, the photographic lenses are focused. Eventually, photography is carried out at a proper f-number in an in-focused state.

After photography is completed, the cam ring 2 is further rotated counterclockwise. The resetting projection 2*d* presses the abutment pin 15*b* of the diaphragm plate 15. This causes the diaphragm plate 15 to return to the rotational position P15A in FIG. 10 which is the reset position.

As mentioned above, the photographic lens unit 101 is requested to rotate the cam ring 2 for advancing or withdrawing the lens frame 3 for the purpose focusing and for setting the diaphragm plate 15 to a rotational position for aperture narrowing. For, for example, making an automatic focus movement, an exposure value is determined first, and then an f-number is set. Thereafter, the automatic focus movement is made. When a diaphragm driving range is set within the automatic focus movement range in the cam portion 2*c* of the cam ring 2, there arises a drawback that the diaphragm is displaced during the automatic focus movement.

The cam ring 2 is therefore designed to work independently as a means for performing advancement/withdrawal drive and a means for performing diaphragm drive. Specifically, the cam ring is designed so that the setting and resetting projections 2*d* and 2*e* for driving the diaphragm work only in a range outside the lens frame advancement/withdrawal range 2*c*B that is an effective range of lens frame drive. Thus, aperture narrowing is carried out accurately, and a mechanism for driving the diaphragm can be laid out readily. Moreover, the cam ring 2 is provided with both an automatic focus mechanism and diaphragm driving mechanism separately. Consequently, a manufacturing process of adjustment and parts can be simplified.

Furthermore, since the cam ring 2 is shaped like a ring and the cam portion on the cylindrical end surface is used to drive the lens frame 3 for advancement or withdrawal, an increase in thickness in the optical-axis direction can be suppressed. Moreover, the cam ring 2 is mounted on the lens frame of the photographic lens unit, and the optical members including the lens frame which will be described later are stowed inside the cam ring 2. There are few jutting parts. The photographic lens unit itself becomes compact, and the efficiency in stowing the members improves. Moreover, since the cam portion is located inside, it can be avoided that dust or the like adheres to the cam surface. Eventually, deterioration of performance in automatic focus drive can be avoided.

Next, a shutter opening/closing movement responsive to the on-off operation of the electromagnet 6 will be described.

When the plunger 22 of the electromagnet 6 is located at the thrust position P22A, the shutter blade 14 is, as shown in FIG. 11, located at an open position or a position to which the notched part 14 withdraws from the photographic aperture 11*c*. When the plunger 22 is attracted to lie at the attracted position P22B, the shutter blade is driven to pivot clockwise via the shutter driving lever 9 and moved to a close position P14B or a position at which the shutter blade closes the photographic aperture 11*c*.

After photography is completed, when the electromagnet 6 is turned off, the plunger 22 is returned to the thrust position P22A owing to the constraining force of the return spring 23. This causes the shutter blade 14 to return to an open position P14A or a position at which the photographic aperture 11*c* is open.

As mentioned above, the direction (x-axis direction) in which the open aperture portion 15*d* and stops 15*e* and 15*f* of the diaphragm plate 15 are moved to be switched, and the direction (y-axis direction) in which the notched part 14*c* of the shutter blade 14 is moved are crossing at the optical axis O. By adopting this arrangement, deterioration of accuracy in time required for keeping the shutter open (shutter speed in seconds) is resolved.

For example, when a stop is displaced in the y-axis direction that is the direction in which the notched part is moved, the time required for the notched part 14*c* to pass through the stop after the electromagnet 6 is turned off, that is, the shutter speed varies. Thus, the accuracy in shutter speed deteriorates.

High accuracy can be guaranteed for the distances in the y-axis direction of the stops 15*e* and 15*f* of the diaphragm plate 15, because the accuracy is determined by the accuracy of a single part.

On the other hand, a position in the x-axis direction or the direction in which the stops are moved, at which the diaphragm plate is retained after being clicked, may be deviated slightly because of the compound influence of the accuracy in position of the positioning ball 16 to be held in the back frame 11 and the accuracy in position of the stops of the diaphragm plate 15.

In the photographic lens unit of this embodiment, as mentioned above, since the accuracy in position in the y-axis direction of the stop 15*e* or 15*f* of the diaphragm plate 15 is so good that the deterioration of the accuracy in shutter speed in seconds caused by the attraction of the plunger 22 can be avoided. As mentioned above, the accuracy in positioning in the x-axis direction or the direction in which the stops are moved to be switched of the stops 15*e* and 15*f* is not always high. Nevertheless, only a little displacement occurs in a direction orthogonal to the direction in which the notched part 14*c* of the shutter blade 14 is moved. The shutter speed is hardly affected.

Instead of the structure where the directions in which the stops 15*e* and 15*f* of the diaphragm plate and the notch 14*c* of the shutter blade are moved respectively are mutually orthogonal, if a structure where the directions in which the stops 15*e* and 15*f* of the diaphragm plate and the notch 14*c* of the shutter blade, which constitute the shutter mechanism, are moved respectively are not mutually orthogonal but the same with each other were adopted, the deterioration of the accuracy in positioning in the movement direction of the stops would lead to the deterioration of the accuracy in shutter speed.

The shutter blade 14 has the V-shaped notched part 14*c* as a portion for closing the photographic aperture 11*c*. The characteristic of a change in amount of light passing through the notched part 14*c* will be described in conjunction with FIGS. 13 and 14. FIG. 13 is a graph showing a change in amount of light passing through the shutter blade in relation to the strokes of the plunger or elapsed times. FIG. 14 is a diagram showing a change in area of the aperture in relation to the strokes of the plunger 22.

As illustrated, on an early stage of a closing movement, the aperture 11*c* is blocked laterally while being hidden behind the the two sides of the notched part 14*c* which are inclined like letter V.

Figure 26:
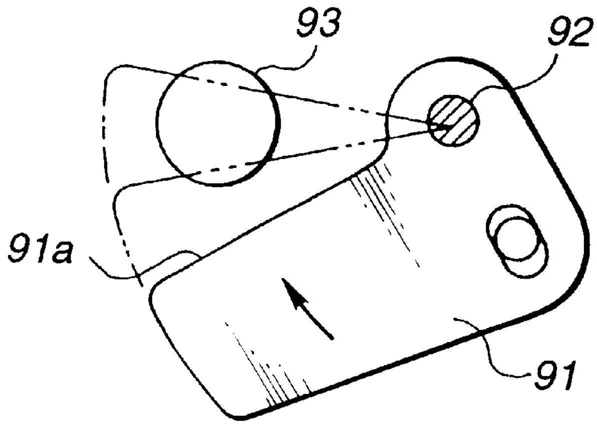
FIG. 26 is a diagram showing the structure of a shutter blade that is a straight blade in a conventional photographic lens unit.

In the case of a conventional shutter blade that is a straight blade as shown in FIG. 26, an aperture 93 is gradually hidden behind a straight part 91*a* of a shutter blade 91 that can pivot about a support axis 92. As seen from the graph of FIG. 27 showing a change in amount of light passed through the conventional shutter blade, the change in amount of light in relation to the strokes of a plunger is linear.

On the other hand, when the electromagnet 6 is turned on to start attraction, a speed at which the plunger is attracted changes in such a manner that the attracting speed is slow on an early stage of drive because of the inertia of the plunger or frictional force and then gets higher gradually.

Figure 27:
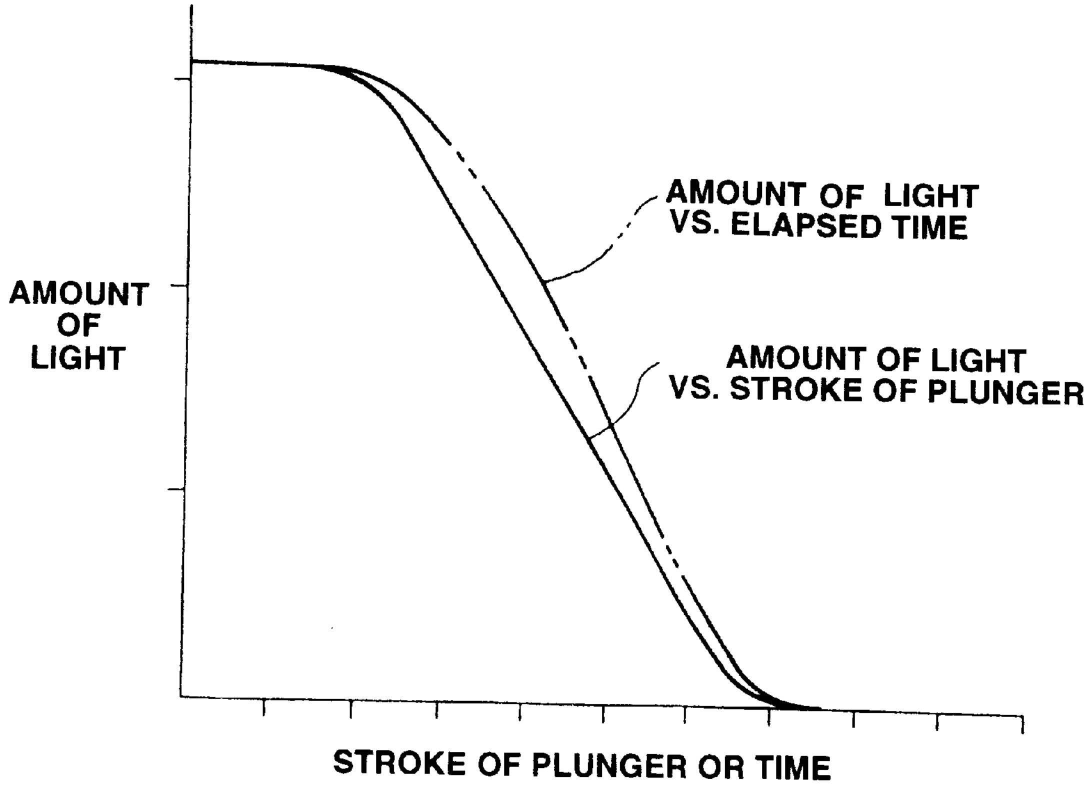
FIG. 27 is a diagram showing a change in amount of light passed by the conventional shutter blade shown in FIG. 26 in relation to the strokes of a plunger for an electromagnet or elapsed times.

As for the change in amount of light passing through the conventional shutter blade 91 in relation to elapsed times, as shown in FIG. 27, the change in amount of light is slow on an early stage on which a short time has elapsed. Namely, the change in amount of light is slow initially and then gets faster. As for a shutter speed, since the elapsed time required until the amount of light is halved is regarded as the shutter speed, even if the time required until a shutter is closed is the same as that of the shutter in the present invention, since the change in amount of light is slow on the early stage, an apparent shutter speed is lower.

By contrast, the shutter blade 14 in the photographic lens unit of this embodiment closes the aperture while hiding it behind the V-shaped notched part thereof as described in conjunction with FIG. 14. A rate at which the area of the aperture is reduced by an initial movement is high, and the rate at which the amount of light is reduced is high. Even if a movement of attracting the plunger 22 is slow initially, the amount of light can be reduced linearly relative to the passage of time as shown in FIG. 13. Eventually, an apparent shutter speed can be made higher.

Now, a series of photographic operations to be carried out when the photographic lens unit 101 is incorporated in an automatic focus camera will be described. First, when a release switch is pressed to a first step thereof, exposure value detection is carried out. After a lens frame focusing position or a position to which the lens frame is moved for focusing is detected in the course of an automatic focus movement, the press of the release switch to a second step is awaited. When the release switch is pressed to the second step, the cam ring 2 is rotated clockwise so that the counter-cam portion passes from the diaphragm resetting position through the lens frame driving range and reaches a diaphragm setting position at which the diaphragm is set according to the result of the exposure value detection, for example, a medium open position. Thereafter, the cam ring 2 is rotated counterclockwise in order to drive the lens frame 3 to an in-focus position, which is detected when the release switch is pressed to the first step, via the counter-cam portion 11*h* of the lens frame. Photography is then carried out.

The angle of rotation of the cam ring 2 is dominated by the number of driving pulses applied to the stepping motor 5. However, when consideration must be taken into a backlash of the gear 2*a* or the like, the lens frame 3 is set to the already detected in-focus position by temporarily rotating the cam ring 2 counterclockwise beyond the in-focus position by several extra steps, and then rotating the cam ring 2 clockwise. By driving the cam ring 2 in this way, high-precision automatic focus can be achieved.

After photography is completed, the cam ring 2 is rotated counterclockwise for returning the counter-cam portion 11*h* of the lens frame to the reset position or a position at which the diaphragm is set to the full open state, that is, the position P0 on the cam portion 2*c*.

As mentioned above, in the photographic lens unit 101, when photography has been completed, the diaphragm is reset to the full open state. This makes it possible to start an in-focus position detecting movement, which is part of an automatic focus movement, immediately after the start of subsequent photography. The time required for preparations is shortened and maneuverability improves. Moreover, since the automatic focus movement is carried out at the full open position all the time, the depths of the fields of the lenses can be made small, and high-precision data can be obtained by carrying out range finding.

Furthermore, according to the photographic lens unit 101, the cam mechanism including the cam portion carries out automatic focus drive and diaphragm drive. The timing of automatic focus drive and the timing of diaphragm drive will therefore not become inconsistent with each other. A manufacturing process of adjustment will become unnecessary, and the number of parts will decrease. This is advantageous even costwise. Moreover, since the cam mechanism has no jutting part, the efficient use of the space in the camera in which the lens frame is stowed improves. Besides, dust will not adhere to the cam surface. This leads to an improvement of the accuracy in automatic focus. Furthermore, since the center interval of the movable range of the cam mechanism is used to drive the driven part enabling automatic focus, and the end intervals of the movable range of the cam mechanism are used to drive the diaphragm, a large number of adjustment steps can be defined for automatic focus. This enables high-precision adjustment.

Next, a variant of the photographic lens unit 101 shown in the development in FIG. 12 in terms of the cam ring 2 will be described. As already described, the cam ring 2 is designed to be rotated for advancing or withdrawing the lens frame and for setting or resetting the diaphragm. The rotational positions in the areas 2*c*A and 2*c*C on the cam portion, at which the diaphragm setting and resetting movements are made, are located at the ends of the cam portion and considerably separated from the effective advancement/withdrawal range 2*c*E defined as part of the area 2*c*B that is the lens frame advancement/withdrawal area.

During a series of photographic operations, the cam ring 2 is rotated for moving the counter-cam portion from the diaphragm resetting position to the lens frame advancement/withdrawal area, and then photometry is carried out. Thereafter, the cam ring 2 is rotated until the counter-cam portion comes to the diaphragm setting position at the end of the cam portion. Thereafter, the counter-cam portion is returned to the lens frame advancement/withdrawal area, and then automatic focus drive is carried out. Since the cam ring 2 is rotated so that the counter-cam portion comes from the diaphragm resetting position to the setting position away from the resetting position, a long time is required for the rotation. This leads to a longer time lag. Furthermore, the time required for completing an automatic focus movement gets longer.

Figure 15A:
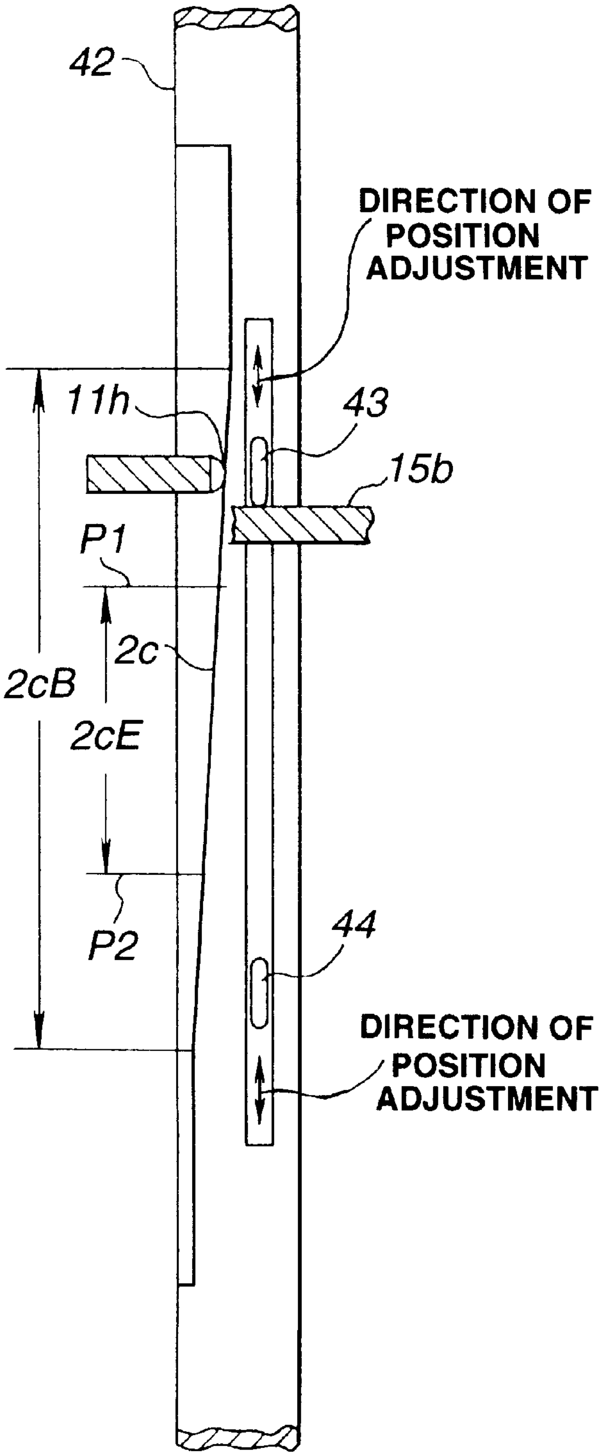
FIG. 15A shows the development of a cam ring in a variant which is different from the cam ring in the photographic lens unit shown in FIGS. 1 and 2.

In this variant, a cam ring is intended to solve the above drawbacks. As seen the development of a cam ring 42 shown in FIG. 15A, the cam ring is structured so that the positions of a diaphragm resetting projection 43 and diaphragm setting projection 44 can be adjusted in a direction of rotation.

To be more specific, in the actual manufacturing process of assembling and adjustment, the effective lens frame advancement/withdrawal area 2*c*E is defined within the lens frame advancement/withdrawal area 2*c*B on the basis of advanced and withdrawn positions of the lens frame 3 which are needed for an automatic focus movement or positions and at which the lens frame is advanced and withdrawn. The positions of the diaphragm resetting projection 43 and diaphragm setting projection 44 are adjusted and fixed so that diaphragm resetting or setting can be carried out at a rotational position on the cam ring 3 which is as close as possible to the area 2*c*E.

By adopting the cam ring 42 having the positions of the diaphragm resetting and setting projections thereof adjusted as mentioned above, the time required for completing diaphragm setting, the time required for completing an automatic focus movement, and the time required for completing diaphragm setting can be shortened. A time lag can be reduced, and quick photography can be achieved. Moreover, the flange-focus distance of the photographic lenses can be adjusted. Furthermore, a magnitude of advancement or withdrawal of the lens frame is limited. An occupied space can be minimized.

Figure 15B:
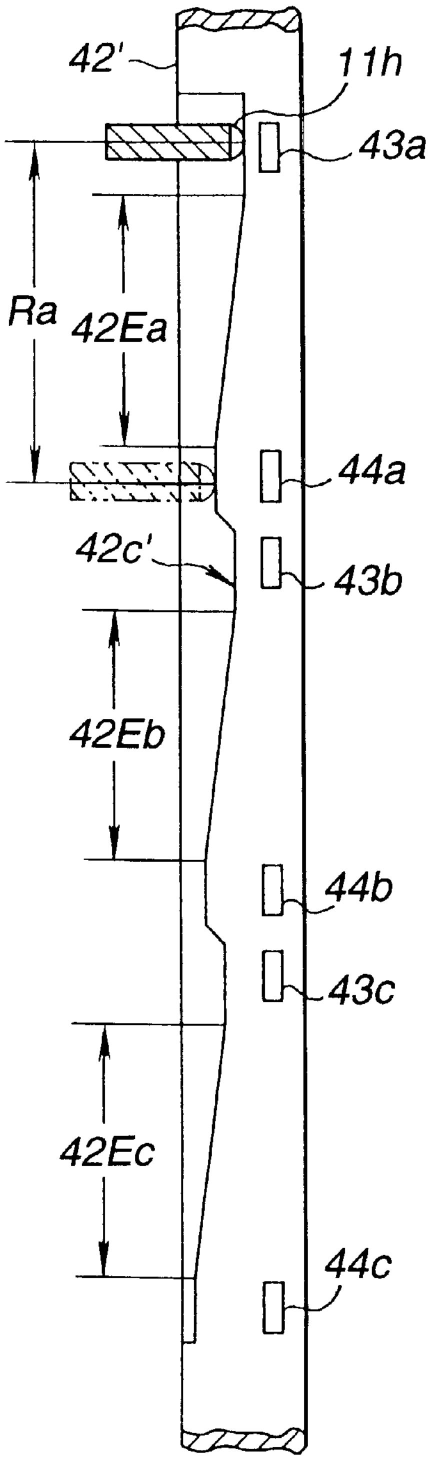
FIG. 15B shows the development of a cam ring in another variant which is different from the cam ring in the photographic lens unit shown in FIGS. 1 and 2.

Next, another variant in which, like the foregoing variant, the positions of the diaphragm setting and resetting projections need not be adjusted, and the time required for completing an automatic focus movement can be shortened will be described using the development of a cam ring shown in FIG. 15B.

A cam ring 42' in this variant includes a first cam portion 42E*a*, second cam portion 42E*b*, and third cam portion 42E*c* which are a plurality of division cam portions each having diaphragm setting and resetting flat parts at both ends. The cam ring 42' further includes projections 43*a* and 44*a*, projections 43*b* and 44*b*, and projections 43*c* and 44*c*, which are used for resetting and setting the diaphragm and on which the abutment pin 15*b* of the diaphragm plate 15 abuts within a cam ring rotatable range within which the counter-cam portion 11*h* of the lens frame 3 lies on any of the flat parts at both ends of the cam portions.

The first cam portion 42E*a*, second cam portion 42E*b*, and third cam portion 42E*c* are three division cam portions each providing a magnitude of a movement which corresponds to a given flange-focus distance. The movable ranges defined by the three cam portions overlap the lens frame advancement/withdrawal range 2*c*B. The projections are arranged so that the abutment pin 15*b* can abut on any of the projections at a rotational position that is as close as possible to any of the movable ranges defined by the cam portions. In this variant, the number of division cam portions is three. However, the number of division cam portions is not limited to three but any required number of division cam portions may be formed.

In the cam ring 42' in this variant, an optimal one of the plurality of cam portions is selected according to the flange-focus distance of the lenses during assembling and adjustment of the lens frame. At this time, the diaphragm resetting and setting projections associated with the selected cam portion are chosen and then actually used as a driving unit enabling an aperture-narrowing movement and automatic focus movement. For example, when the cam portion **42E*a* is selected, the cam ring 42' is rotated by an angle defined by a rotatable range Ra that is a relatively narrow range including the cam portion 42E*a*** and its flat ends in order to enable the aperture-narrowing movement or automatic focus movement.

When the cam ring 42' in this variant is adopted, an automatic focus movement range can be selected in line with the flange-focus distance of the lenses during assembling and adjustment of the lens frame. This enables a high-precision and quick automatic focus movement. Moreover, unlike the aforesaid variant, it is unnecessary to adjust the positions of the projections.

Figure 16:
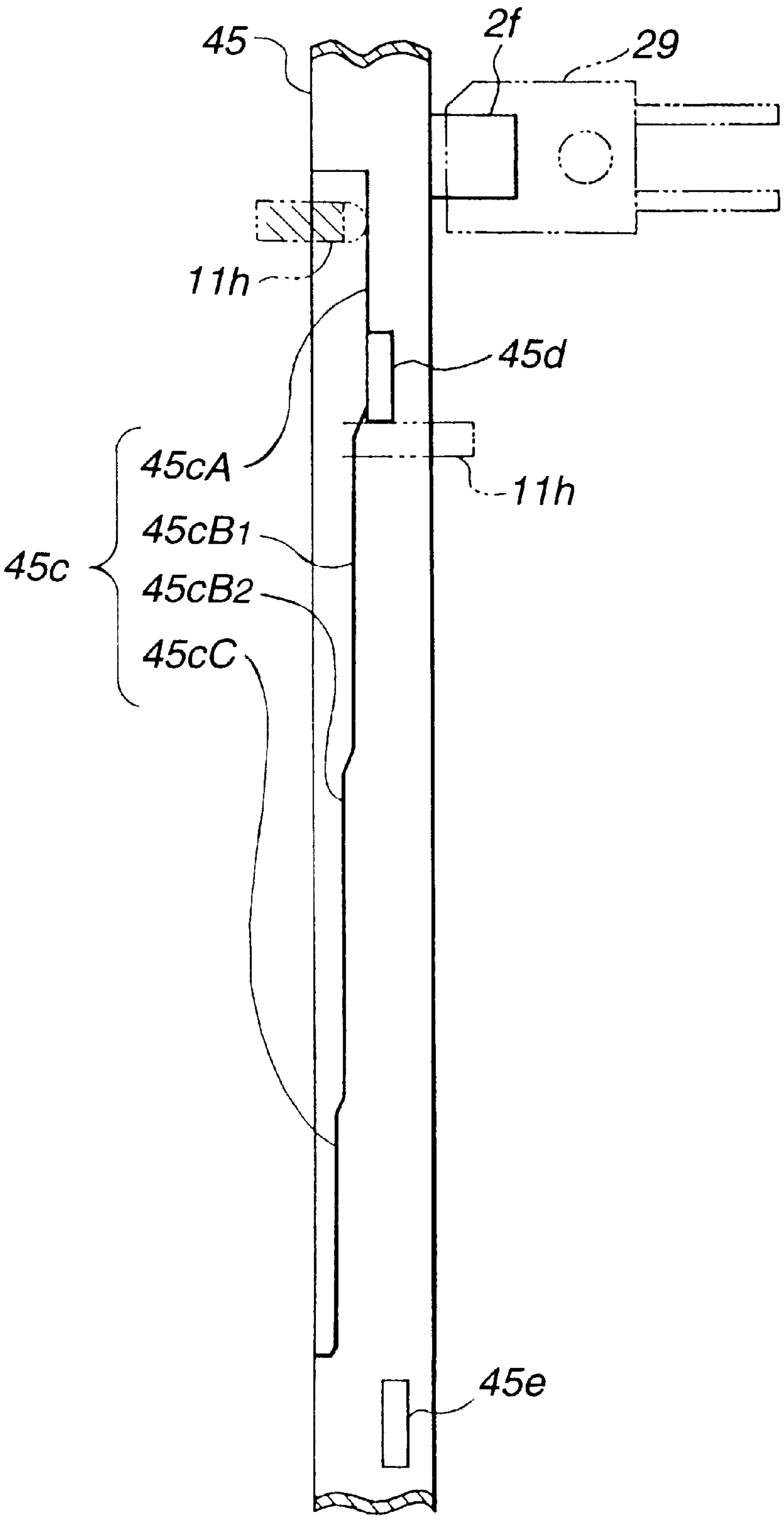
FIG. 16 shows the development of a cam ring in yet another variant which is different from the cam ring in the photographic lens unit shown in FIGS. 1 and 2.

Next, a variant of the photographic lens unit 101 shown in FIG. 12 and others in terms of the cam ring 2 will be described. A cam ring 45 in this variant is, as seen from the development shown in FIG. 16, a cam ring for a photographic lens unit adaptable to a camera capable of performing zone focusing. Specifically, the cam ring 45 has, like the cam ring 2, a cam portion **45*c* composed of diaphragm resetting and setting areas 45*c*A and 45*c*C that are flat at both ends thereof, and two lens frame advancement/withdrawal areas 45*c*B1 and 45*c*B2, which constitute a stepped position restricting portion, in the center thereof. The areas 45*c*B1 and 45*c*B2** are areas used to focus the lenses on an infinite position and a very near position respectively.

Using the cam ring 45, even if a rotational position or a position on the cam ring whose angle is changed in order to focus the lenses on the infinite position or very near position is deviated a little, the advanced or withdrawn position of the lens frame will not be deviated. The cam ring should merely be driven stepwise. Control of automatic focus drive can therefore be simplified.

Incidentally, the cam ring 45 in the variant has a two-step cam surface as an advancement/withdrawal area. Alternatively, a cam surface having three or more steps may be adopted. Furthermore, part of the stepped lens frame advancement/withdrawal area may be used for driving the photographic lenses for advancement or withdrawal during macrophotography.

Figure 17:
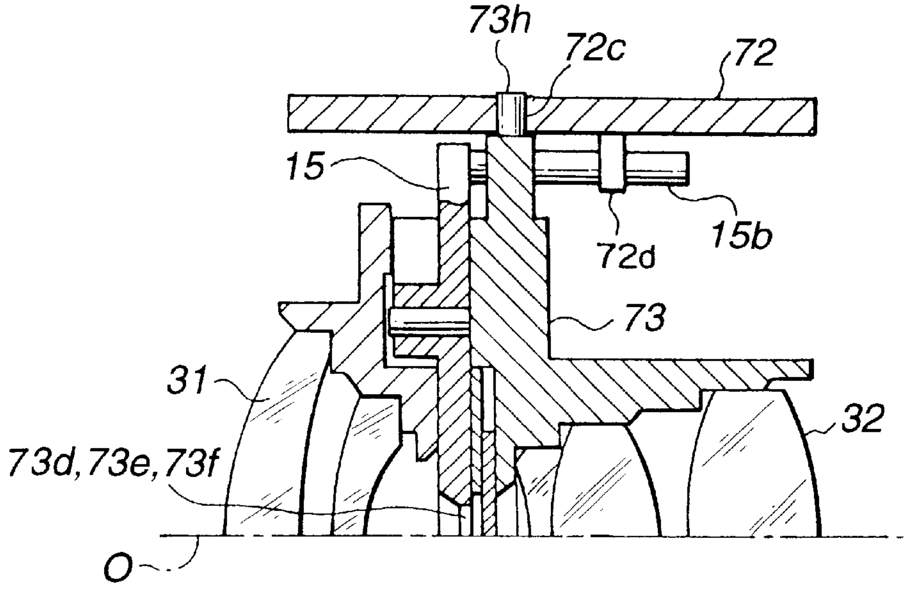
FIG. 17 is a longitudinal sectional view of a major portion of a photographic lens unit in which a cam cylinder is incorporated in place of the cam ring in the photographic lens unit shown in FIGS. 1 and 2.
Figure 18:
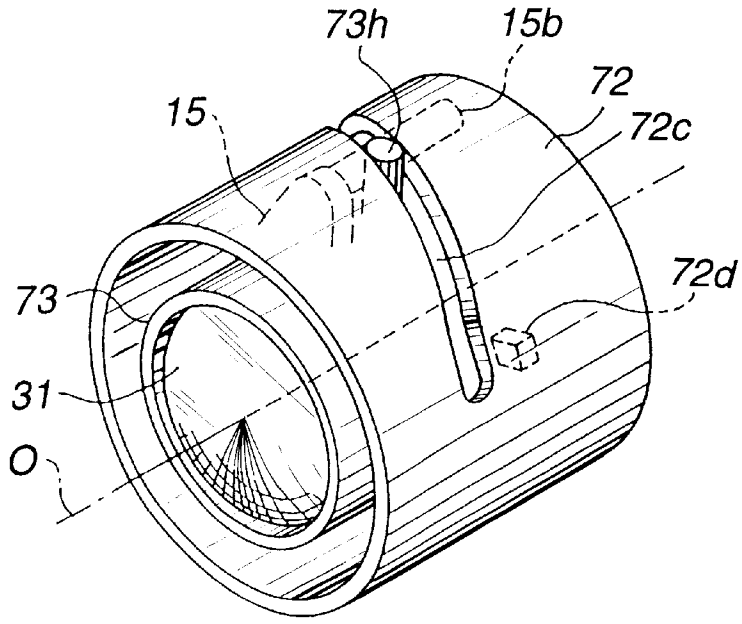
FIG. 18 is an oblique view of the major portion of the photographic lens unit shown in FIG. 17.

Next, a photographic lens unit adopting a cam cylinder in place of the cam ring 2 in the photographic lens unit 101 will be described in conjunction with FIGS. 17 and 18. FIG. 17 is a longitudinal sectional view of a major portion of the photographic lens unit in which the cam cylinder is incorporated, and FIG. 18 is an oblique view of the major portion of the photographic lens unit.

A cam cylinder 72 is shaped like a cylinder. A groove cam **72*c* used to drive a lens frame 73 for advancement or withdrawal by way of a cam follower 73*h* is formed along the outer circumference of the cam cylinder 72, and a diaphragm resetting projection 72*d*** is formed on the inner circumference thereof. A diaphragm setting projection and a gear portion for driving the cam cylinder are also formed, though they are not illustrated.

A movement of driving the lens frame 73 of the photographic lens unit of this variant, in which the cam cylinder 72 is incorporated, for advancement/withdrawal movement, and a movement of driving the diaphragm plate 15 are identical to those in the photographic lens unit of the aforesaid embodiment. According to this photographic lens unit, the cam cylinder 72 can be stowed in the main unit easily. The efficiency in mounting parts can therefore be improved.

Next, another variant of the photographic lens unit 101 in terms of the cam ring 2 will be described. A cam ring in this variant has, in addition to the cam portion **2*c* used to drive the counter-cam portion 11*h*** of the lens frame, a cam portion used to drive a strobe flashing unit so that the strobe flashing unit can pivot. By driving the strobe flashing unit so that it can pivot, the optical axis of the strobe unit can be changed so that flashlight is directed toward an object during macrophotography.

Figure 19:
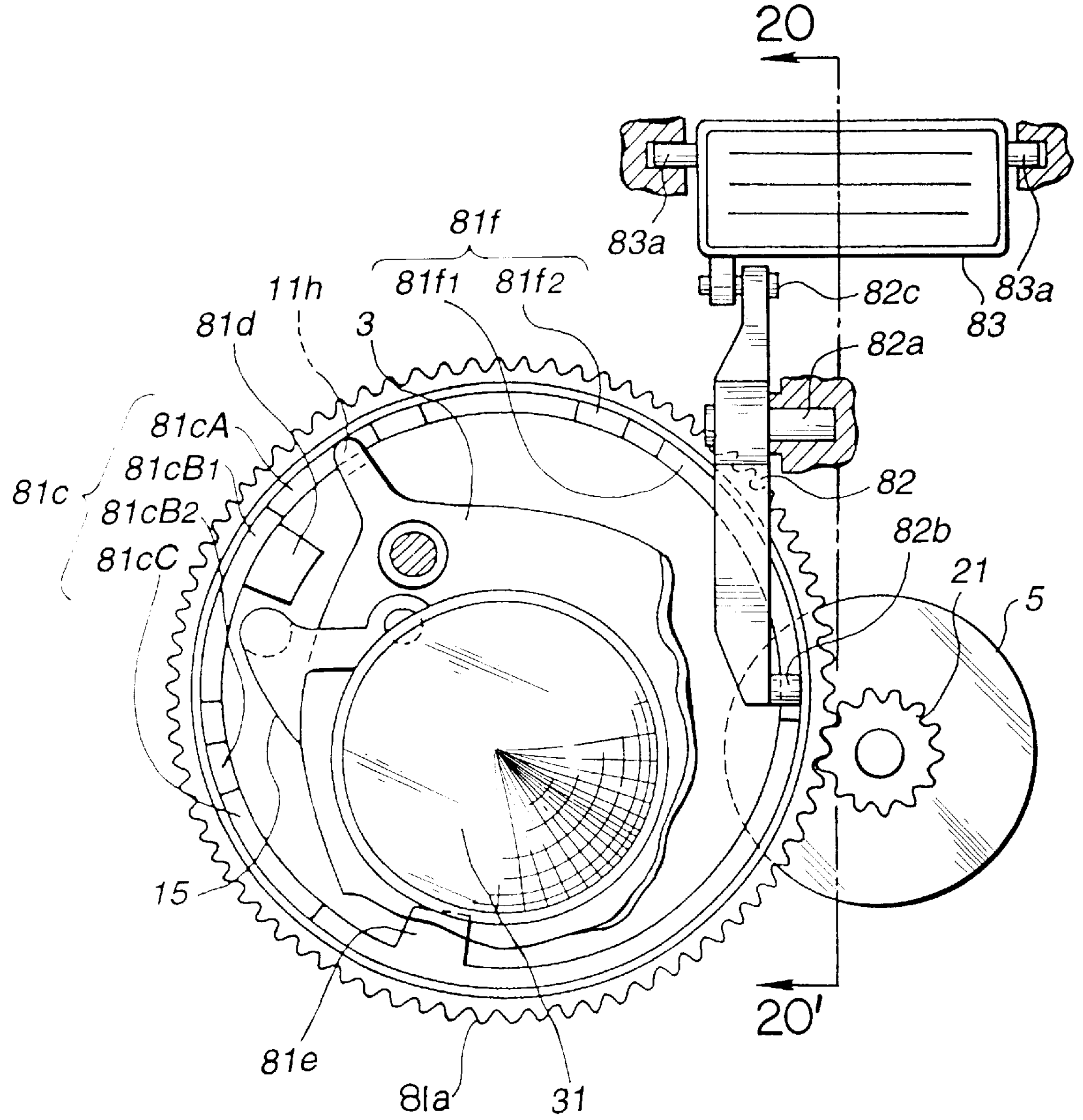
FIG. 19 is a view showing a photographic lens unit of a variant, in which a cam ring different from the cam ring in the photographic lens unit shown in FIGS. 1 and 2 is incorporated, and a strobe unit with the units seen from the object side.
Figure 20:
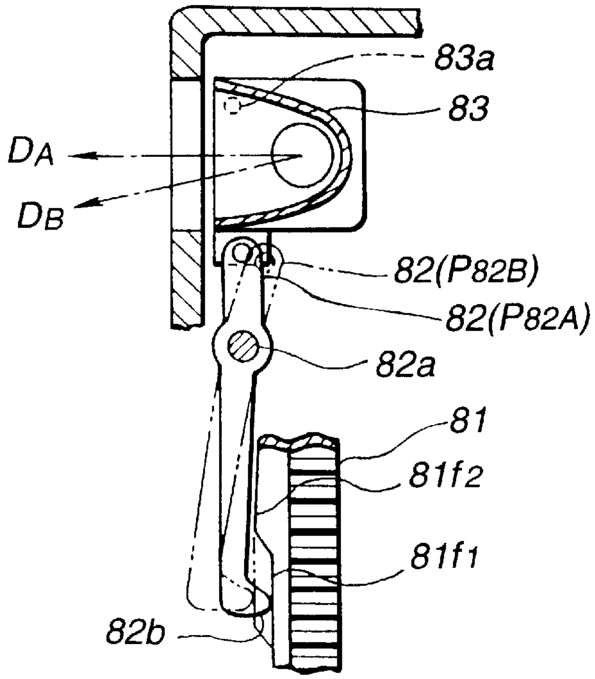
FIG. 20 is a 20—20' sectional view relevant to FIG. 19.

FIG. 19 is a sectional view showing the photographic lens unit of the variant including a cam ring 81 and a strobe unit with the units seen from an object side. FIG. 20 is a 20—20' sectional view relevant to FIG. 19.

The cam ring 81 has, like the cam ring 2, a driving gear portion **81*a* on the outer circumference thereof; a cam portion 81*c* that can abut on the counter-cam portion 11*h* of the lens frame 3, serves as an automatic focus driving mechanism enabling automatic focus, and is a cam formed on a cylindrical end surface; a resetting projection 81*d* and setting projection 81*e* constituting a diaphragm driving mechanism capable of abutting on the diaphragm plate 15 so as to drive it; and a strobe driving cam portion 81*f* formed outside an area allocated to the cam portion 81*c***.

A strobe flashing unit 83 is supported by the main unit via support axes **83*a* so that the strobe flashing unit 83 can be driven freely. The strobe flashing unit 83 can pivot with respect to a driving pin 82*c* of a strobe driving lever 82 which is supported by a support axis 82*a* so that the strobe driving lever 82** can swivel freely.

The cam portion **81*c* of the cam ring 81 has flat areas 81*c*A and 81*c*C at both ends thereof, and a lens frame advancement/withdrawal area 81*c*B1 used for normal photography and a lens frame advancement/withdrawal macrophotography area 81*c*B2 used for macrophotography in the center thereof. The cam portion 81*f* has a flat area 81*f*1, on which a counter-cam portion 82*b* of the strobe driving lever 82 can abut and which is symmetric to the lens frame advancement/withdrawal area 81*c*B1, and a strobe driving macrophotography area 81*f*2 symmetric to the lens frame macrophotography area 81*c*B2**.

When the photographic lens unit of the variant having the above components and the cam ring is used to carry out macrophotography, the cam ring 81 is rotated until the counter-cam portion **11*h* of the lens frame abuts on the lens frame macrophotography area 81*c*B2. This brings the lens frame 3 to a macrophotographic state. At this time, the abutment portion 82*b* of the strobe driving lever 82 abuts on the microphotography area 81*f*2 of the cam portion 81*b*. This causes the strobe flashing unit 83 to pivot, whereby the direction of flashlight emanating from the strobe flashing unit 83** is changed from a direction DA defined in the normal photographic state to a downward direction DB associated with macrophotography.

As mentioned above, according to the photographic lens unit of this variant adopting the cam ring 81, the direction of flashlight emanating from the strobe flashing unit can be changed to a downward direction, that is, a direction close to the optical axis O of the photographic lenses for macrophotography. Macrophotography can therefore be carried out in an excellent light-distributed state.

In the photographic lens unit, the direction of flashlight emanating from the strobe unit is changed. The present invention is not limited to this mode. Alternatively, the optical axis of a viewfinder which is variable may be changed with the rotation of the cam ring in order to correct a parallax.

Figure 21:
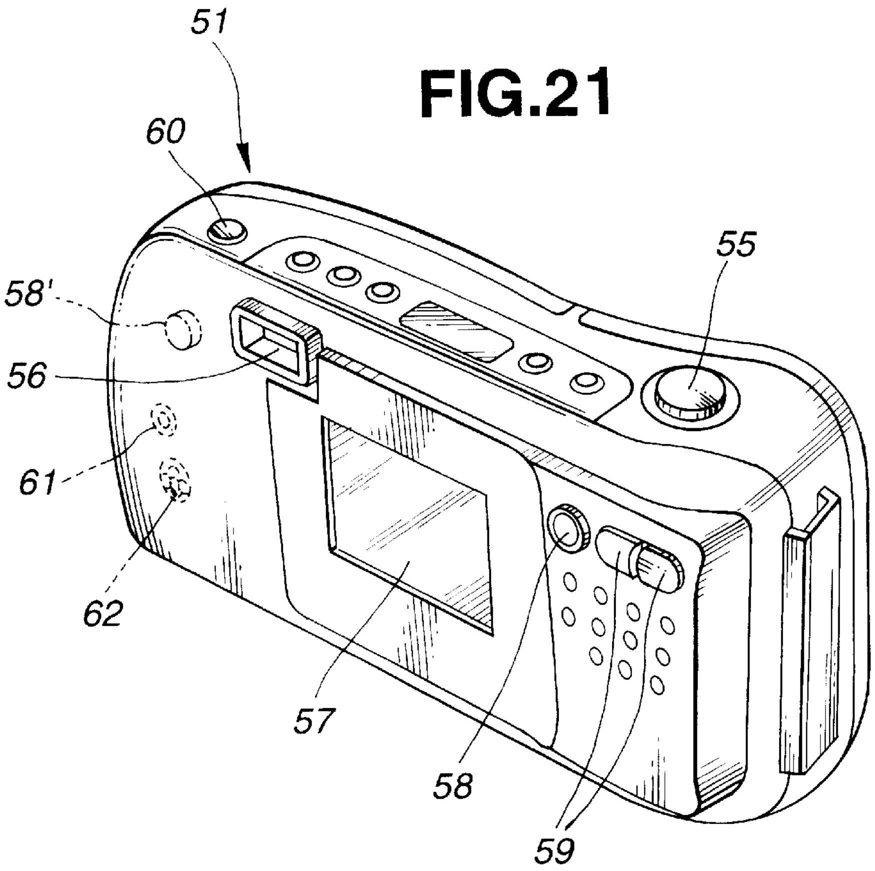
FIG. 21 is an oblique view showing the back appearance of an electronic still camera with a barrier in which the photographic lens unit shown in FIGS. 1 and 2 is incorporated.
Figure 22:
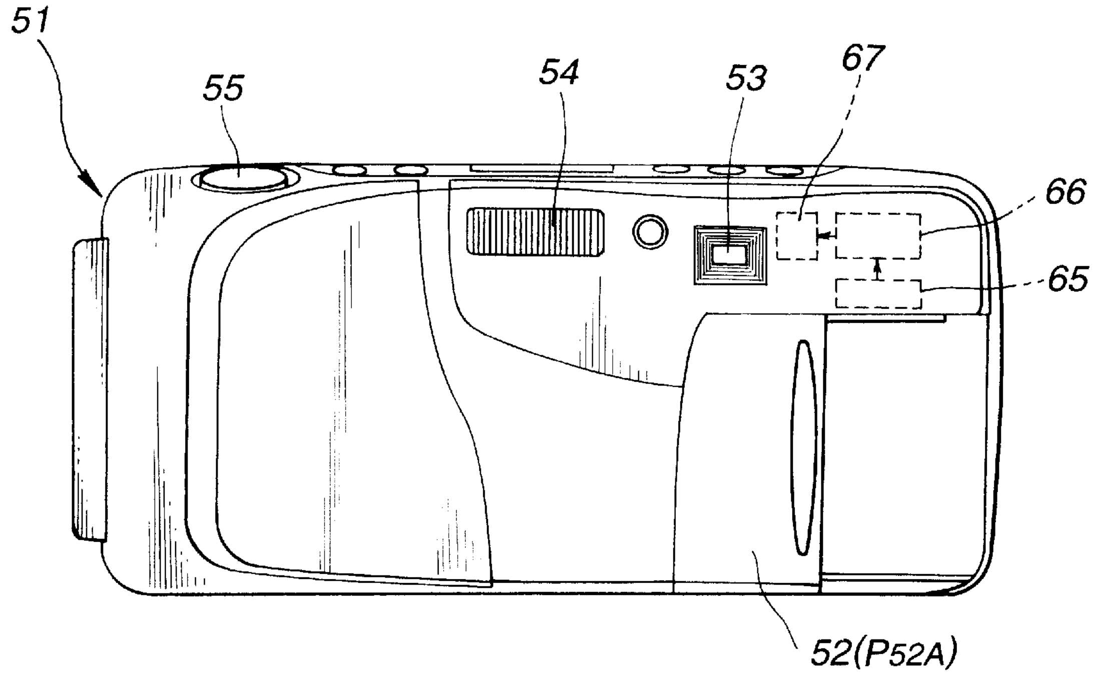
FIG. 22 is a front view of the camera shown in FIG. 21 in a state in which a barrier is closed.
Figure 23:
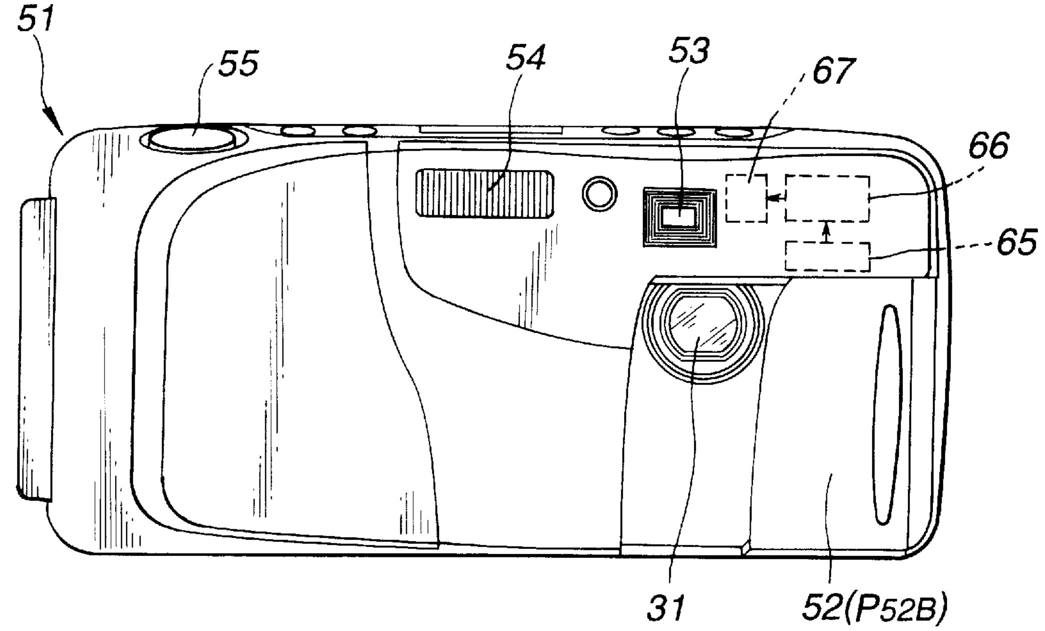
FIG. 23 is a front view of the camera shown in FIG. 21 in a state in which the barrier is opened.

Next, an electronic still camera 51 with a barrier in which the photographic lens unit 101 shown in FIGS. 1 and 2 is incorporated and which has an automatic focus function will be described. FIG. 21 is an oblique view showing the back appearance of the camera 51. FIGS. 22 and 23 are front views of the camera with a lens barrier 52 closed and opened respectively.

On the face of the camera 51, there is the barrier 52 capable of sliding between a close position P52A or a position at which the photographic lens 31 is closed and an open position P52B or a position at which the photographic lens 31 is open. Responsively to the opening or closing movement of the barrier, a barrier switch 65 incorporated in the camera is turned on or off. An output signal of the barrier switch 65 is input to a system controller 66 for controlling drive given by the motor, electromagnet, or the like. Furthermore, a viewfinder window 53 and strobe window 54 are located on the face of the camera 51.

On the back of the camera 51, there are a viewfinder 56, an LCD monitor 57 for displaying a picked-up image, which is a through picture produced by the CCD, a reproduced image of a projected image, or information of various characters, an LCD switch 58 working as a switch used to instruct that the LCD monitor 57 should be turned on or off and lying at a position, which permits a user to handle the LCD switch readily with the thumb of his/her right hand holding the camera, on the right hand of the LCD monitor 57, and a frame selection switch 59 used to select a frame to be reproduced during image reproduction.

On the top of the camera 51, there are a release switch 55 capable of being pressed with the index finger of a hand holding the camera, a macrophotography switch 60 used to instruct macrophotography, and other operation switches. Moreover, an external power supply connector 62 via which another battery can be connected, and a communication connector 62 via which a personal computer or the like can be connected are located in the left-hand area of the back of the camera.

Since the external power supply connector 61 and communication connector 62 into which cables or the like are plugged are located in the left-hand area of the back of the camera, even when the camera having the cables plugged thereinto is held by a right hand, the cables will not interfere with the right hand.

In a conventional electronic still camera, a selection switch for use in switching a photography mode and a reproduction mode is formed independently. Using the switch, it is determined whether an image to be displayed on the LCD monitor or the like is displayed as an image to be seen through the viewfinder or an image represented by data stored internally is displayed thereon. The selection switch is not used in a natural manner in the course of handling the camera for photography. A user must be express his/her intention of carrying out reproduction or photography.

In the camera including the photographic lens unit of the present invention, an output of the barrier switch 65 interlocked with the barrier 52 is used to detect whether the barrier 52 is closed or open. When the barrier 52 is open, the photography mode is selected. When the barrier 52 is closed, if the LCD switch 58 is turned on, the reproduction mode is selected automatically. Mode setting can therefore be performed smoothly and readily. The camera is thus user-friendly.

Next, a photography/reproduction sequence to be carried out in the electronic still camera 51 with a barrier will be described using the flowchart of FIG. 24. When a battery is loaded, the sequence is started. At step S10, it is judged from an output signal of the barrier switch 65 whether or not the barrier is open. If the barrier is closed, control is passed to step S11. If the barrier is open, a photography mode in which data of a projected image is recorded in the memory 67 is selected. Control is then jumped to step S16.

At step S11, it is judged whether or not the LCD switch 58 is pressed. If the LCD switch 58 is not pressed, control is returned to step S10. When the barrier 52 is closed, the LCD switch 58 is watched all the time. If the LCD switch 58 is pressed, a reproduction mode is identified. The LCD monitor 57 is then turned on (step S12).

In the reproduction mode, the LCD switch 58 acts electrically as a toggle switch. Even if the LCD switch 58 is released, the LCD monitor 57 remains on. A frame is then reproduced using a latest projected image (step S13). As long as the LCD switch 58 is on, frame reproduction is continued (step S14). Selecting a frame to be reproduced during reproduction can be achieved using the frame selection switch 59.

When the LCD switch 58 is pressed again to be turned off, control is passed to step S15. The LCD monitor 57 is then turned off, and the routine is terminated.

By contrast, when the photography mode is selected and control is jumped to step S16, first, the photographic lenses are reset. At step S17, an output of the barrier switch 65 is checked to see if the barrier is closed. If the barrier is closed, the routine is terminated. If the barrier is not closed, the state of the LCD switch 58 is checked (step S18).

If the LCD switch 58 is off, the LCD monitor 57 is turned off (step S23). Control is then passed to step S24 that will be described later. Thereafter, the press of the release switch 55 is awaited with the LCD monitor 57 off.

When the LCD switch is checked and found to be on, photography is carried out in a state in which the LCD monitor 57 functions as a viewfinder. The LCD monitor 57 acts as a viewfinder, that is, displays an object image while the LCD switch 58 is held down. When the LCD switch 58 is released, the LCD monitor 57 is turned off. The switch 58 is therefore located at a position permitting a user to handle the switch 58 easily with the thumb of his/her right hand holding the camera. With this handling, the LCD monitor 57 requiring a relatively large amount of power can remain off when it is unnecessary. This contributes to power saving.

Thereafter, control is passed to step S19. The cam ring 2 is rotated for moving the photographic lenses to a pan focusing position. Photometry is carried out and a CCD shutter is adjusted (steps S20 and S21). A through image produced by the CCD is displayed on the LCD monitor 57 (step S22). At step S24, the press of the release switch 55 is awaited.

When the release switch 55 is pressed, the cam ring 2 is rotated for driving the lens frame 3 to an in-focus position, and photometry is carried out (steps S25 and S26). The cam ring 2 is further rotated for driving the diaphragm, and the lens frame 3 is driven to the in-focus position (steps S27 and S28). Thereafter, the shutter is driven for carrying out exposure (step S29). After the diaphragm is reset (step S30), control is returned to step S16. When it is detected that the barrier is closed, the routine is terminated.

Since the camera 51 may be held by a left hand, an LCD switch 58' may be located on the left hand of the LCD monitor 57 so that while the LCD switch 58' is pressed with the thumb of the left hand, the release switch 55 can be handled with the index finger of a right hand.

Figure 24:
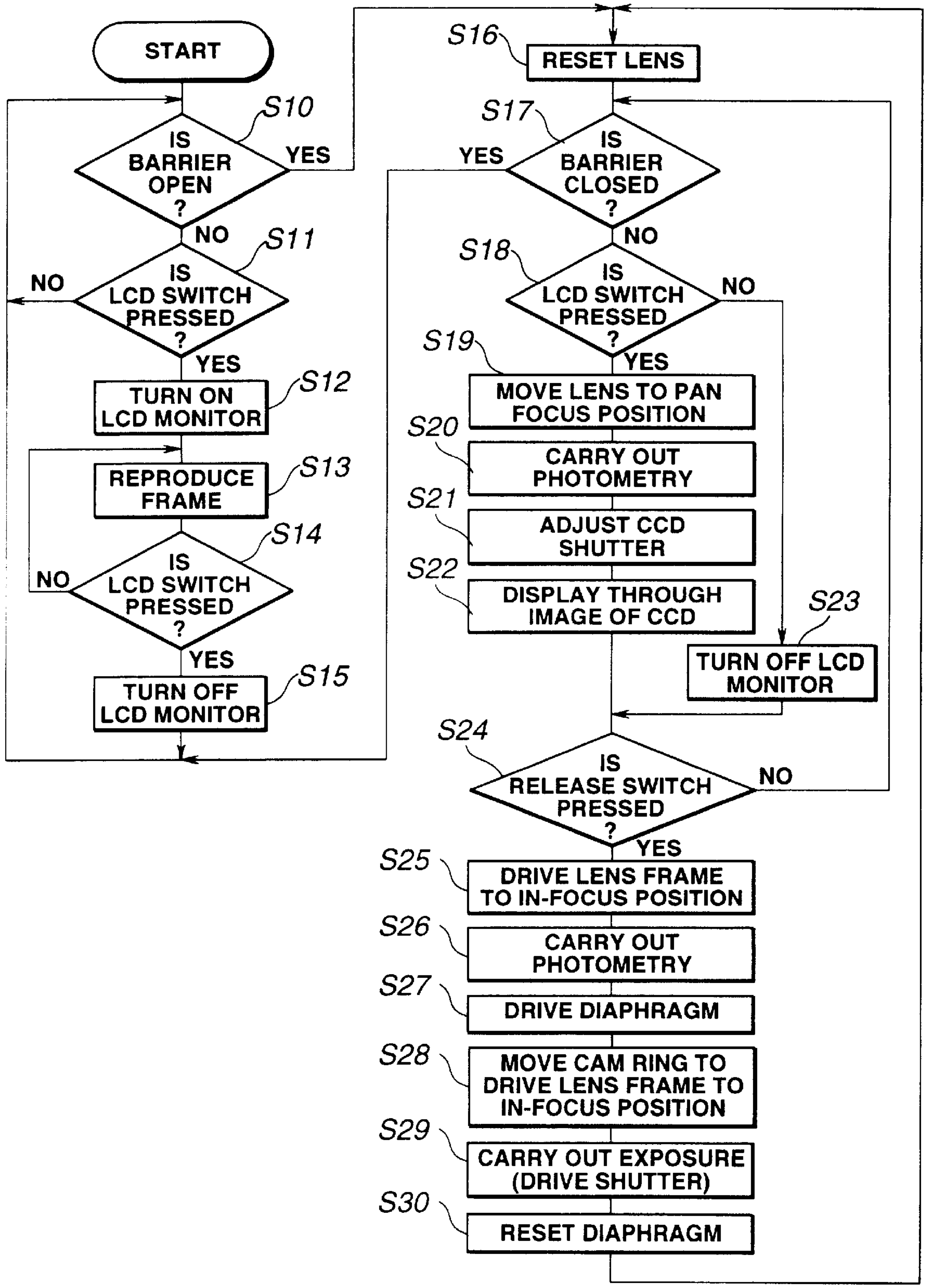
FIG. 24 is a flowchart describing a photography/reproduction sequence to be carried out in an electronic still camera in which the photographic lens unit shown in FIGS. 1 and 2 is incorporated.
Figure 25A:
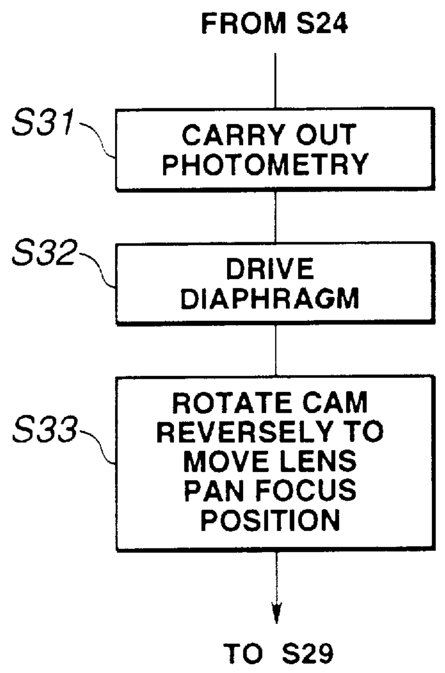
FIG. 25A is a flowchart describing part of a photography sequence to be carried out in a manual focusing type camera that is a variant of the camera in which the photography/reproduction sequence described in FIG. 24 is carried out.

Moreover, when the camera is a manual focusing type electronic still camera, photography is carried out by running a routine identical to the foregoing routine except that steps S25 to S28 of the photography sequence within the routine described in the flowchart of FIG. 24 are replaced with steps S31 to S33 described in the flowchart of FIG. 25A.

Next, an electronic still camera in which a photographic lens unit having a function for preventing, discoloration of an imaging device will be described as a variant of the electronic still camera 51, in which the photographic lens unit of the aforesaid embodiment is incorporated and of which photography/reproduction sequence is described in FIG. 24, using the flowchart of FIG. 25B.

In the conventional electronic still camera adopting a turret type diaphragm mechanism, normally, a diaphragm is set to an open aperture state and a barrier is open. Direct sunlight falls on the CCD for a prolonged period of time. This is undesirable because discoloration of a color filter mounted in the CCD is accelerated.

In the photographic lens unit to be incorporated in the camera of the variant, when an input from any switch is not detected for a prolonged period of time with the barrier open, the diaphragm is moved from the full open state to a state corresponding to f-number F11, that is, the diaphragm plate 15 is driven to the position (P15B) at which the little stop 15 works. An amount of light falling on the color filter is thus minimized, whereby discoloration is prevented.

Figure 25B:
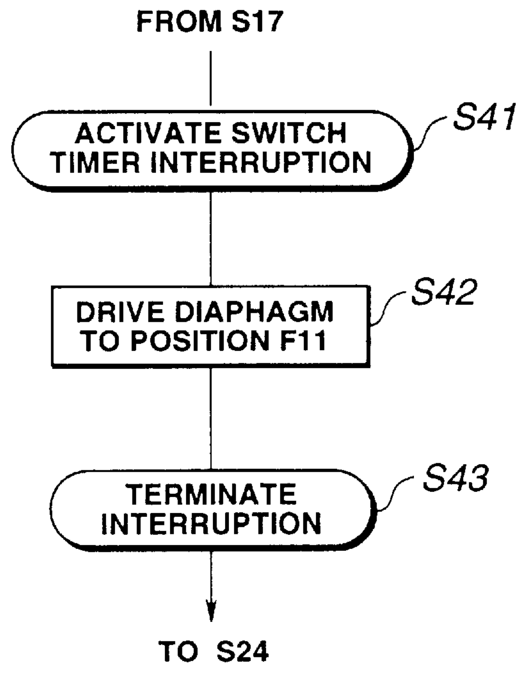
FIG. 25B is a flowchart describing part of the photography sequence including switch timer interruption to be carried out in the variant as part of the photography/reproduction sequence described in FIG. 24.

In other words, after it is detected at step S17 in the flowchart of FIG. 24 that the barrier is open, when it is recognized that no switch is handled for a prolonged period of time, a switch timer interruption routine (step S41) described in FIG. 25B is activated. The diaphragm is driven to the position associated with f-number F11 (step S42), and then the interruption routine is terminated. Control is then returned to step S24 in FIG. 24.

According to the variant, as far as an electronic still camera adopting the turret type diaphragm mechanism is concerned, even if the barrier remains open under direction sunlight, the diaphragm is set automatically to an aperture-narrowing state. An amount of light falling on the color filter is thus reduced, whereby discoloration of the color filter can be prevented.

What is claimed is:

1. A photographic lens unit in which an automatic focus driving mechanism for driving a driven part enabling automatic focus of photographic lenses and a diaphragm driving mechanism for driving a diaphragm share a common driving element, wherein:

said driving element is a cam mechanism having a cam portion used for automatic focus, wherein a center interval within a movable range on said cam mechanism is used to drive said driven part enabling automatic focus, and end intervals within the movable range on said cam mechanism are used to drive said diaphragm and wherein an interval different from the intervals used for automatic focus and diaphragm drive within the movable range on said cam mechanism is used as an interval for adjusting a position of a strobe unit for macrophotography.

2. A photographic lens unit according to claim 1, wherein a driving unit for causing a strobe optical system to pivot is formed in the interval on said cam mechanism for use in adjusting the position of the strobe unit for macrophotography.

3. A photographic lens unit in which an automatic focus driving mechanism for driving a driven part enabling automatic focus of photographic lenses and a diaphragm driving mechanism for driving a diaphragm share a common driving element, wherein:

said driving element is a cam mechanism having a cam portion used for automatic focus, wherein a center interval within a movable range on said cam mechanism is used to drive said driven part enabling automatic focus, and end intervals within the movable range on said cam mechanism are used to drive said diaphragm and wherein said diaphragm driving mechanism is made movable relative to said cam mechanism so that a displacement of an entire lens frame caused by adjusting a flange-focus distance of said photographic lenses can be absorbed with movement.

4. A photographic lens unit according to claim 3, wherein said diaphragm driving mechanism is located near the interval within the movable range on said cam mechanism which is used for automatic focus.

5. A photographic lens unit in which an automatic focus driving mechanism for driving a driven part enabling automatic focus of photographic lenses and a diaphragm driving mechanism for driving a diaphragm share a common driving element, wherein:

said driving element is a cam mechanism having a cam portion used for automatic focus, wherein a portion of said cam mechanism serving as said automatic focus driving mechanism is a stepped position restricting portion, and wherein part of said position restricting portion is associated with positions of said lenses for macrophotography.

* * * * *